(12) United States Patent
Aoki

(10) Patent No.: US 7,778,470 B2
(45) Date of Patent: Aug. 17, 2010

(54) MOVING PICTURE PROCESSOR, METHOD, AND COMPUTER PROGRAM PRODUCT TO GENERATE METASHOTS

(75) Inventor: Hisashi Aoki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1420 days.

(21) Appl. No.: 10/935,245

(22) Filed: Sep. 8, 2004

(65) Prior Publication Data

US 2005/0089224 A1  Apr. 28, 2005

(30) Foreign Application Priority Data

Sep. 30, 2003  (JP)  ............................. 2003-342210
Nov. 6, 2003  (JP)  ............................. 2003-377282

(51) Int. Cl.
*G06K 9/62* (2006.01)
(52) U.S. Cl. ...................................... 382/225; 382/224
(58) Field of Classification Search ................. 382/224, 382/225, 228
See application file for complete search history.

(56) References Cited

U.S. PATENT DOCUMENTS

| | | | |
|---|---|---|---|
| 6,023,520 A * | 2/2000 | Nagasaka et al. | ............ 382/107 |
| 6,466,731 B2 | 10/2002 | Aoki et al. | |
| 6,710,822 B1 * | 3/2004 | Walker et al. | ................ 348/722 |
| 6,754,389 B1 * | 6/2004 | Dimitrova et al. | ............ 382/224 |

(Continued)

FOREIGN PATENT DOCUMENTS

JP  7-193748  7/1995

(Continued)

OTHER PUBLICATIONS

Uchihashi et al, Video Manga: Generating Semantically Meaningful Video Summaries, Oct. 1999, ACM Multimedia, 383-392.*

(Continued)

*Primary Examiner*—Brian Q Le
*Assistant Examiner*—Edward Park
(74) *Attorney, Agent, or Firm*—Oblon, Spivak, McClelland, Maier & Neustadt, L.L.P.

(57) ABSTRACT

A moving picture processor includes a similarity calculator which calculates a similarity between shots, which refer to temporal parts of a moving picture, into which the moving picture is divided at a point where a content of the moving picture changes over, a similar shot specifying unit which specifies similar shots based on the similarity, and a grouping unit which makes groups each including the similar shots. The moving picture processor also includes a lead group selector which selects a lead group from the groups. The lead group includes a lead shot to be a head of a metashot. The moving picture processor also includes a lead shot selector which selects the lead shot from shots included in the lead group, and a metashot generator which generates the metashot including the lead shot selected at the head.

58 Claims, 25 Drawing Sheets

U.S. PATENT DOCUMENTS

| | | |
|---|---|---|
| 6,795,127 B1 | 9/2004 | Hori et al. |
| 6,807,306 B1 * | 10/2004 | Girgensohn et al. ......... 382/225 |
| 2003/0122861 A1 * | 7/2003 | Jun et al. .................... 345/720 |
| 2004/0161154 A1 * | 8/2004 | Hua et al. ................... 382/229 |

FOREIGN PATENT DOCUMENTS

| | | | |
|---|---|---|---|
| JP | 9-93588 | | 4/1997 |
| JP | 9-270006 | | 10/1997 |
| JP | 11-266449 | | 9/1999 |
| JP | WO00/48397 | * | 8/2000 |
| JP | 2001-147697 | | 5/2001 |

OTHER PUBLICATIONS

Hisashi Aoki, et al., "Video Interface with Hierarchical Icons Using Repetitious Shot Detection", Journal by Information Processing Society of Japan, vol. 39, No. 5, May 1998, pp. 1317-1324.

Hisashi Aoki, et al., "A Shot Classification Method of Selecting Effective Key-Frames for Video Browsing", Proceedings of ACM Multimedia 96, 1996, pp. 1-10.

* cited by examiner

| GROUP ID | FREQUENCY | SHORTEST | LONGEST | MEAN LENGTH | DISTRI-BUTION | INCLU-SION |
|---|---|---|---|---|---|---|
| A | 6 | 9" | 31" | 19" | 18'11" | no |
| B | 2 | 11" | 13" | 12" | 0'32" | yes |
| C | 2 | 13" | 18" | 15" | 9'40" | no |
| D | 2 | 19" | 20" | 19" | 0'45" | yes |

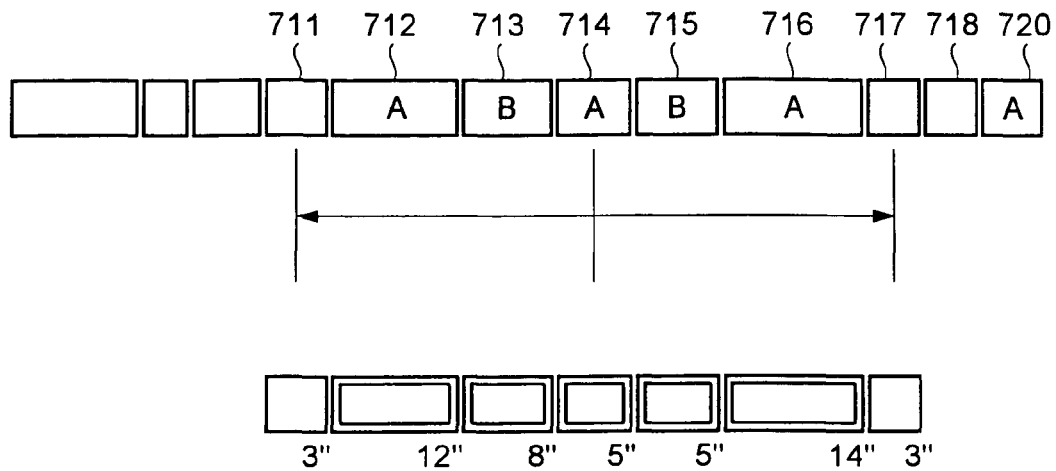
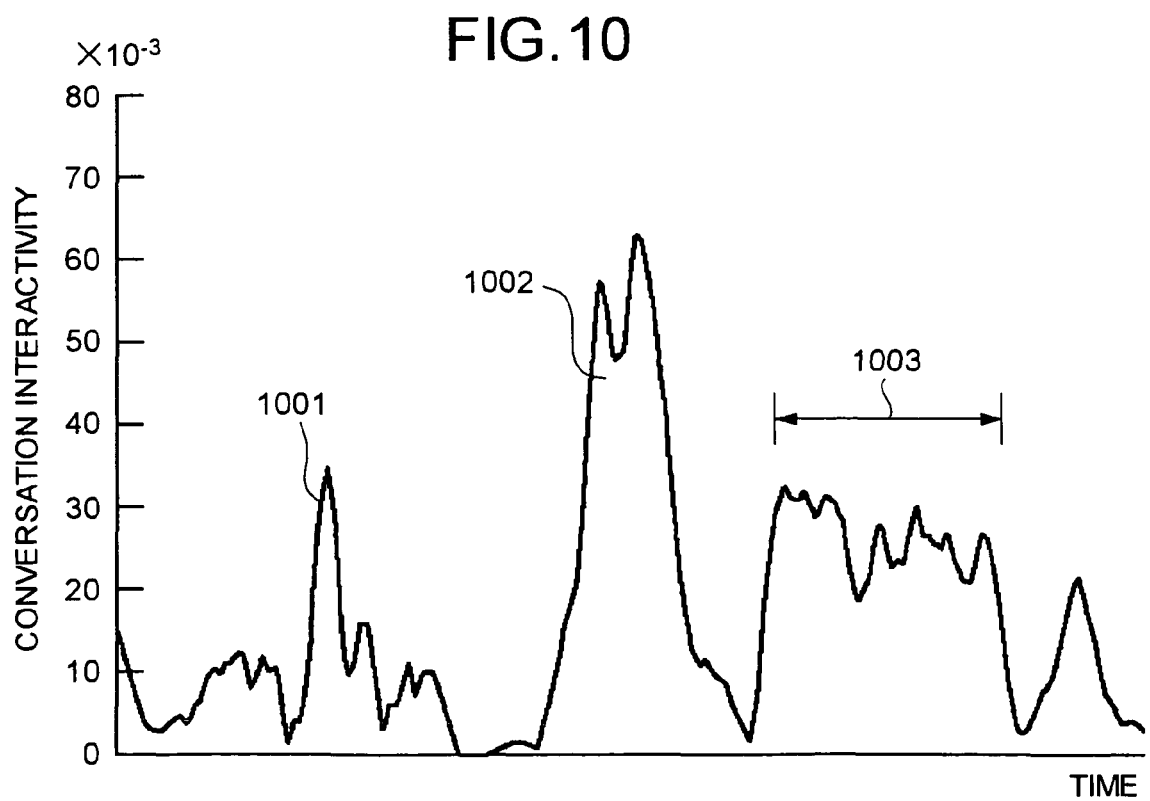

FIG.14

|   | FREQUENCY | SHORTEST | LONGEST | MEAN LENGTH | DISTRI-BUTION | INCLU-SION |
|---|---|---|---|---|---|---|
| A | 4 | 4" | 8" | 5" | 4'00" | no |
| B | 4 | 5" | 10" | 7" | 2'39" | no |
| C | 2 | 8" | 10" | 9" | 0'57" | no |
| D | 3 | 9" | 10" | 9" | 1'02" | no |
| E | 2 | 8" | 8" | 8" | 0'41" | no |
| F | 2 | 10" | 10" | 10" | 0'43" | no |

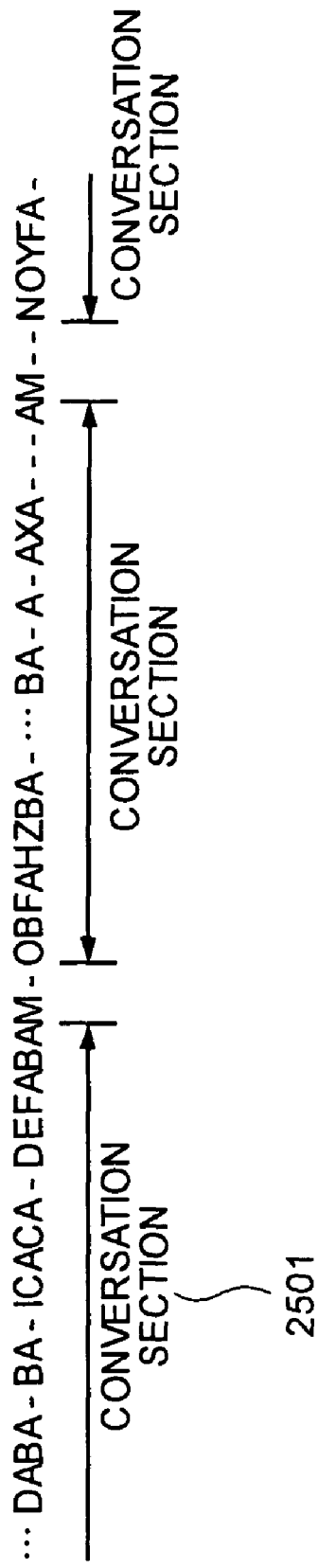

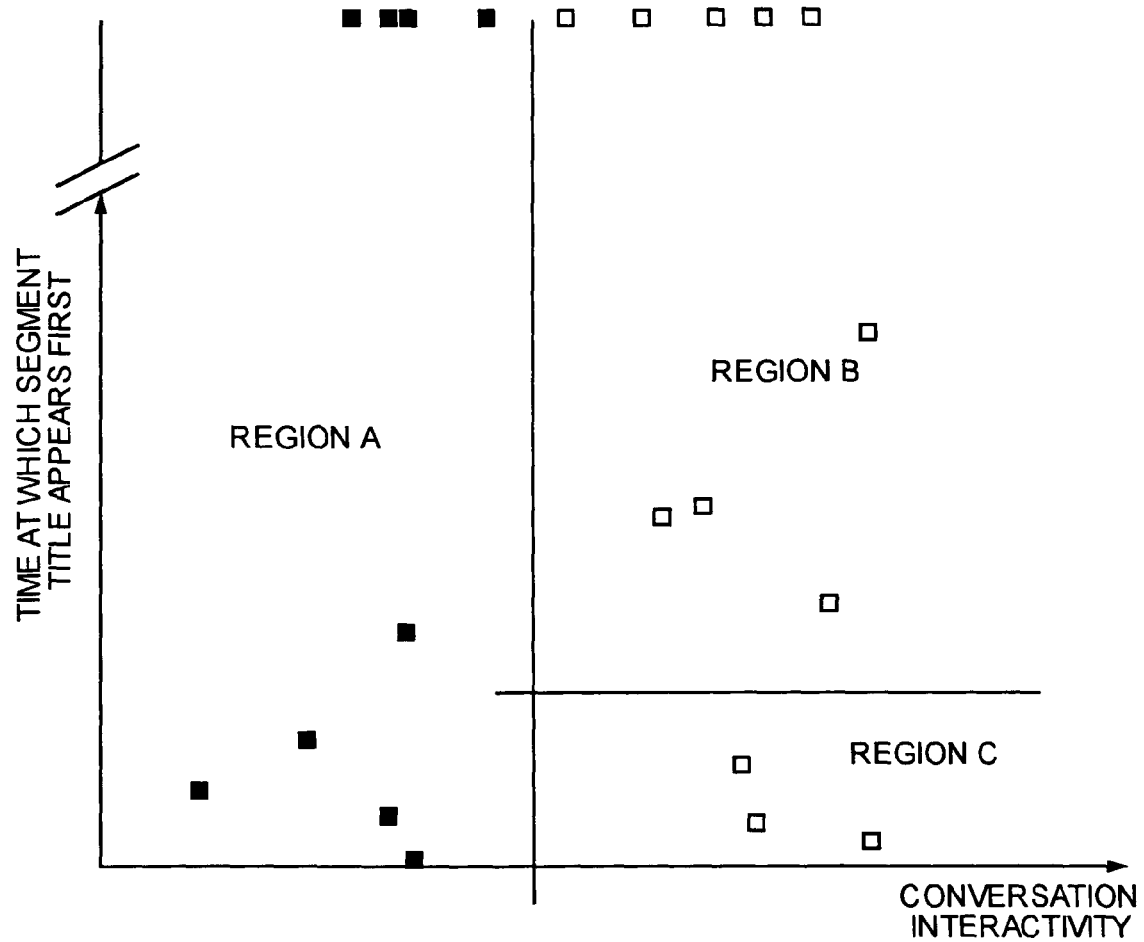

MOVING PICTURE PROCESSOR, METHOD, AND COMPUTER PROGRAM PRODUCT TO GENERATE METASHOTS

CROSS-REFERENCE TO RELATED APPLICATIONS

This application is based upon and claims the benefit of priority from the prior Japanese Patent Applications No. 2003-342210 filed on Sep. 30, 2003 and No. 2003-377282 filed on Nov. 6, 2003; the entire contents of which are incorporated herein by reference.

BACKGROUND OF THE INVENTION

1) Field of the Invention

The present invention relates to a moving picture processor and a moving picture processing method that generate metashots including temporal part(s) of moving pictures (hereinafter referred to as "shot(s)"), being moving pictures divided at a point of scene change (hereinafter referred to as "cut point"), at which the content of the image is changed over due to edition or break of shooting.

2) Description of the Related Art

As high-performance personal computers (PC) and hard disk recorders become widespread, a technique for digitalizing and storing images and moving pictures has been developed. This technique is realized in the form of hardware and software, and realized in hardware not only for business use but also for home use.

Specifically, for example, moving pictures are electromagnetically recorded in a hard disk (HDD) in the PC or the recorder. Therefore, there are benefits in that preferred programs can be reproduced with less waiting time, selective deletion of unwanted programs is easier, and the like, which the conventional video tapes do not have. By the improvement in convenience, the operation of video recording and the like can be easily performed.

On the other hand, there is a problem in that when a large amount of moving pictures is recorded, search of a preferred scene becomes difficult. However, such a problem can be handled by "skipping" of a program by using a fast-forwarding function, to reduce the search time.

However, since such "skipping" is performed by picking up display frames in a unit irrelevant to the structure of the program content, such as one frame in several seconds, a new problem occurs in that an intended scene may be passed over.

In order to solve such a problem, technical study and product development have been conducted, in which an image processing technique is used to segment a moving picture into temporal parts of the moving picture (hereinafter, "shots") according to the points of scene change (hereinafter, "cut points") at which the images in the moving picture are changed over, thereby enabling skipping unwanted shots.

As the temporal segmentation of the moving picture, some segments may be suitable according to the program content, for example, commercials and the main part of the program, and a topic change in a news program. However, only with such cut-detection technique described above, many unwanted segments may be generated even from the middle of commercials, main parts, or news topics.

Further, some of the generated shots are very short, such that the time length to be reproduced is only about several seconds. When the time length of one shot is extremely short, the effect of reducing the search time cannot be expected.

In order to solve such a problem, the present applicant has proposed a method for improving the visibility of a list display by omitting an icon display of similar shots (see Japanese Patent Application Laid-Open No. H9-270006 and U.S. Patent Application #20020071649). Further, a method for structurizing the moving pictures in a unit closer to the original program content by grouping the repetitive units of the image is proposed. The grouping is referred to as "metashot" being a set of continuous shots.

According to the method described in the Patent Literature, in a program in which shots of a newscaster (anchorperson) are dispersed over the whole program, such as a news program, the whole program may be grouped as a metashot, thereby causing a problem in that the program cannot be divided into appropriate metashots.

Further, since the method for segmenting the program into appropriate metashots is different according to the type of the program, a technique in which the program can be segmented into appropriate metashots automatically, regardless of the type of program is desired.

SUMMARY OF THE INVENTION

It is an object of the present invention to at least solve the problems in the conventional technology.

A moving picture processor according to one aspect of the present invention includes a similarity calculator which calculates a similarity between shots, which refer to temporal parts of a moving picture, into which the moving picture is segmented at a point of scene change of the moving picture, a similar shot specifying unit which specifies similar shots based on the similarity, and a grouping unit which makes a plurality of groups each including the similar shots specified. The moving picture processor also includes a lead group selector which selects a lead group from the groups based on a predetermined condition. The lead group includes a lead shot to be a head of a metashot which includes shots. The moving picture processor also includes a lead shot selector which selects the lead shot from shots included in the lead group, based on an appearance pattern in which the shot belonging to the lead group selected appears in the moving picture; and a metashot generator which generates the metashot including the shot selected at the head.

A moving picture processor according to another aspect of the present invention includes a cut detector which detects a point of scene change of a moving picture; a similarity calculator which calculates a similarity between shots, which refer to temporal parts of the moving picture, into which the moving picture is segmented at the point; and a similar shot specifying unit which specifies similar shots based on the similarity. The moving picture processor also includes a grouping unit which makes a plurality of groups each including the similar shots specified; and a moving picture type determination unit which determines a type of the moving picture, based on an appearance pattern in which the similar shots included in one of the groups appear in the moving picture.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a schematic diagram of conversation scenes between an anchorperson and a special correspondent;

FIG. 10 is a graph for explaining conversation interactivity metric calculated by a calculation method explained with reference to FIG. 9;

FIG. 14 is a schematic diagram of statistical information held by a statistic storing unit according to the third embodiment;

FIG. 26 is a schematic diagram of a similar shot appearing pattern in a TV variety show program; and FIG. 27 is a schematic diagram of program type determination using conversation interactivity metric and segment title appearance time.

DETAILED DESCRIPTION

Exemplary embodiments of a moving picture processor, a moving picture processing method, and a moving picture processing program according to the present invention will be explained below with reference to the drawings. The present invention is not limited by the embodiments. In the embodiments, processing at the time of acquiring images of a news program as a moving picture will be explained as an example.

Figure 1:
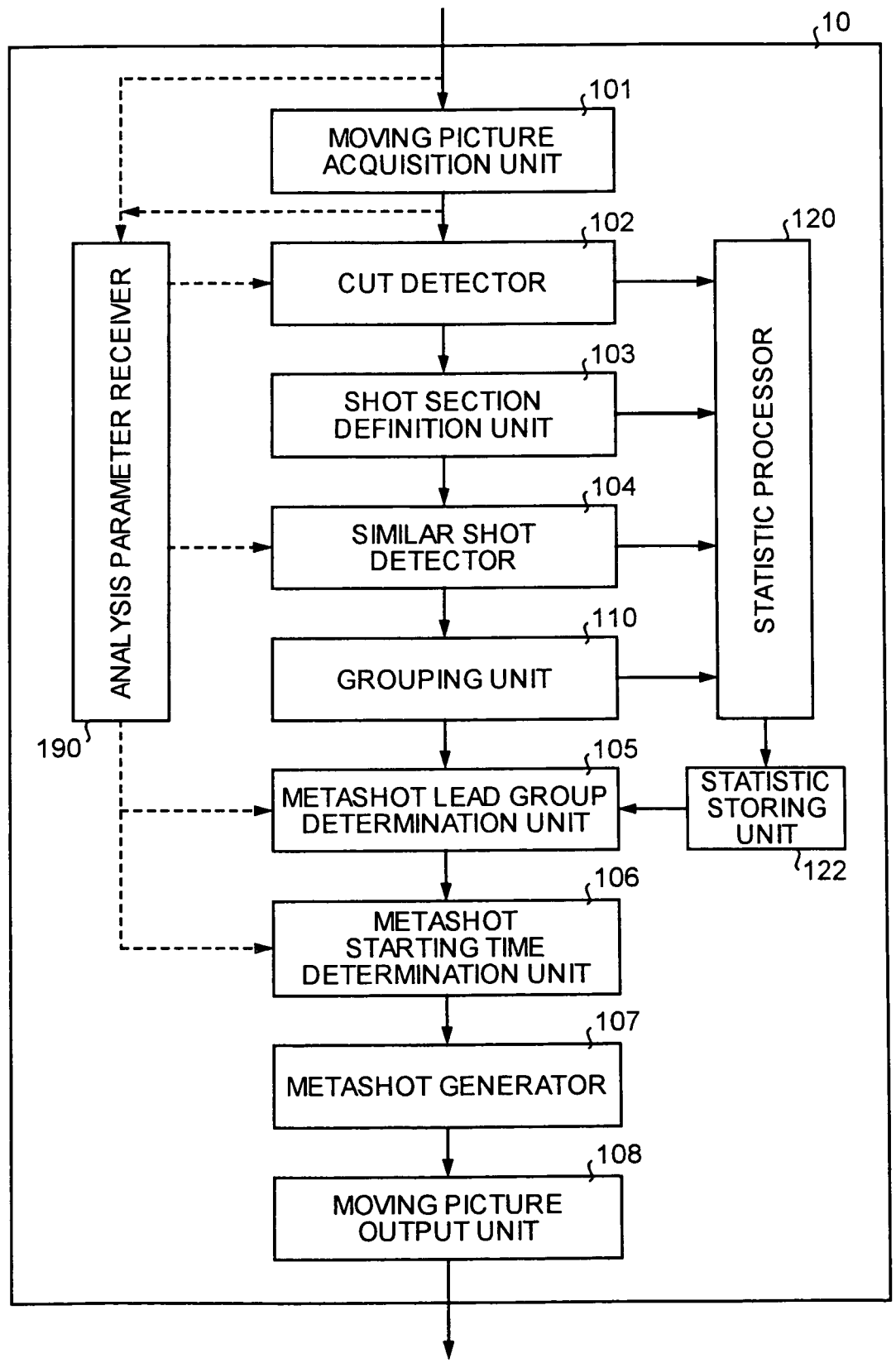
FIG. 1 is a block diagram of the functional configuration of a moving picture processor according to a first embodiment.

FIG. 1 is a block diagram of the functional configuration of a moving picture processor 10 according to a first embodiment. The moving picture processor 10 includes a moving picture acquisition unit 101, a cut detector 102, a shot section definition unit 103, a similar shot detector 104, a grouping unit 110, a metashot lead group determination unit 105, a metashot starting time determination unit 106, a metashot generator 107, a moving picture output unit 108, a statistic processor 120, a statistic storing unit 122, and a conversation interactivity calculator 124.

The moving picture acquisition unit 101 acquires moving pictures from outside via a broadcast program receiver (tuner) or the like connected to, for example, the moving picture processor 10. The moving picture acquisition unit 101 may acquire uncompressed moving pictures, or may acquire moving pictures converted to digital data, such as digital video (DV) format or Moving Picture Experts Group-1, 2, 4 (MPEG-1, 2, 4), being standard formats for moving picture compression.

The moving picture acquisition unit 101 converts the acquired moving picture to a format suitable for processing by the cut detector 102, and sends the converted moving picture to the cut detector 102. Here, the conversion to the suitable format refers to, for example, processing for expanding (decoding) the compressed (encoded) moving picture. Further, this is the processing for converting the moving picture to a necessary and sufficient image size in the processing by the cut detector 102.

The cut detector 102 calculates the similarity of image frames input one by one with respect to the image frame input immediately before, to detect the cut point at which the content of the image is changed over due to edition or break of shooting. When a moving picture in which motion estimation coding is used for image compression, as in MPEG-2 is acquired, the cut point may be detected by using a change in the number of bits used for motion estimation coding.

The method for the cut detector 102 to detect the cut point is not limited to the one shown in the embodiment, and may be realized by various known methods. Such a method is disclosed, for example, in Japanese Patent Application Laid-Open No. H9-93588, which is incorporated herein by reference, and which is filed by the present applicant.

The shot section definition unit 103 defines a set of image frames belonging to a time section enclosed by two cut points arrayed at positions closest timewise, detected by the cut detector 102, as a shot. For example, when a cut point is detected immediately before a 3"15'20 frame, being a frame to be reproduced after 3 minutes 15 seconds 20 frames from reproduction start, and the next cut point is detected immediately before a 3"21'12 frame, frames from the 3"15'20 frame to the 3"21'11 frame are defined as one shot. Here, the reproduction time is the time required until predetermined frames are reproduced from the start of reproduction of images, when the images are reproduced.

The similar shot detector 104 detects similar shots, designating the shot defined by the shot section definition unit 103 as one unit. Specifically, the similar shot detector 104 picks up one or two or more frames from respective shots. And then, the similar shot detector 104 calculates the similarity by comparing these frames.

A method disclosed in Japanese Patent Application Laid-Open No. H9-270006 filed by the present applicant or the like can be used for the similarity comparison of the shots. According to this method, the amount of characteristic is calculated respectively in the two target frames. The distance between these two amounts of characteristic is then calculated. For example, when 36-division histogram is calculated from the hue of pixels belonging to the respective frames, and a vector including respective frequencies in 36 divisions as elements is used as the amount of characteristic, the distance between two characteristic points in the 36-dimensional space is calculated. This distance is a value corresponding to the similarity, and as the distance value becomes smaller, the similarity becomes higher.

When the thus calculated similarity is equal to or larger than a predetermined value, these two shots are detected as shots similar to each other. In this manner, the similar shots are detected based on the similarity between shots.

The similar shot detector 104 calculates the similarity of all other shots included in one moving picture with respect to one shot included in one moving picture. As another example, the similarity may be calculated with respect to one shot, restricting the range to shots of predetermined numbers closest to the shot timewise. The similar shot detector 104 constitutes the similarity calculation unit and the similar shot specifying unit of the present invention.

The grouping unit 110 groups the similar shots by allocating the same label to the similar shots detected by the similar shot detector 104. The statistic processor 120 generates statistical information relating to the groups, for example, the number of appearance of respective groups in one moving picture, based on the information acquired from the grouping unit 110. The statistic storing unit 122 holds the statistical information generated by the statistic processor 120.

The metashot lead group determination unit 105 selects a group of characteristic shots, to be the lead shot of the metashot, from the groups generated by the similar shot detector 104, based on the statistical information held by the statistic storing unit 122.

In news programs, it is often appropriate to designate one news item as a metashot. Therefore, it is desired that the beginning of a news item can be detected as the lead shot. In the beginning of the news item, an anchorperson (a newscaster, an announcer) often appears. Therefore, if a scene in which the anchorperson appears can be detected as the lead group of the metashot, an appropriate metashot can be generated.

As the method by which the metashot lead group determination unit 105 selects a shot of the anchorperson, that is, as the method for determining the lead group in the metashot, for example, a method for performing determination with respect to a plurality of shots belonging to the similar shot group, based on one or two or more conditions, of conditions such as the number of appearance in the news program, the extensiveness of time distribution of the appearance over the whole program, the time length of the shots belonging to the group, and the like, is adopted. The determination method of the lead group will be described later in detail.

The metashot lead group determination unit 105 according to the embodiment constitutes the shot number comparator, the shortest time length comparator, the longest time length comparator, the time length mean value calculator, the mean time length comparator, the shot interval time length measurement unit, the shot interval time length comparator, and the shot position determination unit of the present invention.

The metashot starting time determination unit 106 acquires the lead group determination result from the metashot lead group determination unit 105. The metashot starting time determination unit 106 then specifies the shot to be actually the head of the metashot from the shots belonging to the group determined as the lead group, based on the determination result acquired from the metashot lead group determination unit 105, and defines the reproduction time corresponding to the start position of the specified lead shot as the metashot starting time.

Specifically, the metashot starting time determination unit 106 specifies the shot in which the reproduction time length of the shot has a predetermined length or more as the lead shot. For example, there is a case in which the anchorperson appears in the conversation with a guest in one news item. In this case, the time during which the anchorperson appears in the conversation with the guest is often shorter than the time during which the anchorperson appears at the beginning of the news item. Therefore, by restricting the reproduction time length of the shot to a predetermined length or more, the shot of the anchorperson included in the news item can be excluded from the candidate of the lead shot.

As another example, the metashot starting time determination unit 106 may specify a shot in which the reproduction time length of the shot is not longer than the predetermined length as the lead shot. As another example, the lead shot may be specified based on conditions, such as the time interval with another shot belonging to the same similar shot group, the time sequence with another shot belonging to another similar shot group, distribution, and inclusion.

Further, the lead shot may be specified based on only one condition selected from these conditions, and as another example, the lead shot may be specified based on all these conditions, or two or more conditions selected from these conditions. The metashot starting time determination unit 106 constitutes the lead shot selector of the present invention.

The metashot generator 107 generates a metashot in which the lead shot specified by the metashot starting time determination unit 106 is designated as the head. Specifically, the same label indicating the same metashot is given to the respective shots arranged continuously from the metashot starting time to the next metashot starting time.

In the images of a news program, the time from the head of the news program to the time immediately before the metashot starting time first appears may be determined as the program opening, to label it as the opening metashot. Further, a shot from the last metashot lead time to the end of the news program may be designated as a metashot.

When the moving picture is divided into the metashots, the division result is output from the moving picture output unit 108. The output data is transmitted to, for example, a display unit. The display unit displays the list of the image contents of the moving picture based on the metashots. Alternatively, reproduction display is performed in a unit of metashot.

The moving picture output unit 108 outputs the moving picture divided into the metashots by the metashot generator 107. The moving picture may be output, for example, to the display unit. In this case, the contents of the images (program) are displayed in a list on the display unit. Alternatively, the moving picture is viewed in a unit of metashot.

By displaying the moving picture corresponding to the sections of the metashots, for example, a list screen for each news item can be created. By operating a "skip" button on a remote control, the lead shot in the next news item can be viewed, even while viewing a news item.

Figures 2, 3:
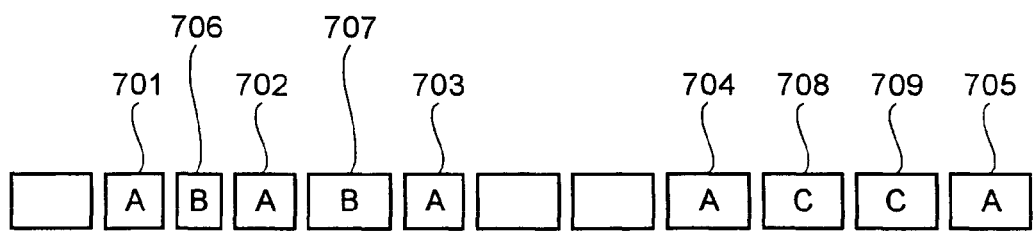
FIG. 2 schematically depicts statistical information held by a statistic storing unit.
FIG. 3 is a schematic diagram of a moving picture.

FIG. 2 schematically depicts the statistical information held by the statistic storing unit 122. As shown in FIG. 2, the statistic storing unit 122 stores information relating to each group, in association with a group ID for identifying the similar shot group. The information relating to each group in this embodiment includes the number of shots (hereinafter, "frequency") belonging to the group, the shortest reproduction time length of the shots belonging to the group (shortest), the longest reproduction time length of the shots belonging to the group (longest), the mean value of the reproduction time length of the shots belonging to the group (mean length), the reproduction time length from the start time of the first shot belonging to the group to the finish time of the last shot (distribution), and whether the distribution extent of the shots of the shot group is included by that of another shot group (inclusion).

The concept of the inclusion will be explained. In the news program, for example, among similar shot groups, the shots of the anchorperson to be the lead shot scatter over the whole moving picture, and in many cases, the shots of other groups exist only between two consecutive shots of the anchorperson shot group. Here, "other groups" for example consist of shots which belong to only one news item. Specifically, shots of overseas correspondent would appear twice or thrice, being determined as similar shots, and being put into a shot group. However, such shots appear only in one news item and exist between anchorperson shots. Therefore, in such case, the shot group of anchorperson is "not-included" by other groups, and the group of overseas correspondent is "included" by other group (specifically, anchorperson group).

In the news program, it can be determined whether the shot is the shot group of the anchorperson, that is, the lead group, based on whether the shot is in the non-inclusion group.

The concept of inclusion will be specifically explained, with reference to FIG. 3. FIG. 3 is a schematic diagram of the moving picture. Respective rectangles represent one shot, and for example, a rectangle added with A indicates a shot belonging to group A. That is, shots added with the same sign belong to the same group. The horizontal axis denotes a time axis. That is, reproduction is performed in order of shot 701 and shot 706. It is assumed here that the B shot and C shot exist only at the positions shown in FIG. 3, in the moving picture.

In FIG. 3, C shots 708 and 709 belonging to group C are both arranged between A shot 704 and A shot 705. The A shot 704 and the A shot 705 are two shots appearing continuously in the direction of time axis. In this case, group C is the inclusion group.

When all shots belonging to the same group exist between two shots belonging to the same group and continuously appearing in the direction of time axis, the shot group existing between the two shots is an inclusion group.

On the other hand, a B shot 706 and a B shot 707 are placed between the A shots, but an A shot 702 is placed between the B shots 706 and 707, and hence the B shots 706 and 707 do not exist between two continuous A shots. Therefore, the group B is a non-inclusion group.

On the other hand, in the group A, for example, an A shot 703 is arranged following B shot 702, but a B shot is not arranged after the A shot 703. Therefore, it is determined that it is not an inclusion group.

The processing in which the metashot lead group determination unit 105 selects the lead group based on the statistical information stored in the statistic storing unit 122 will be explained, with reference to FIGS. 4 and 5.

Figure 4:
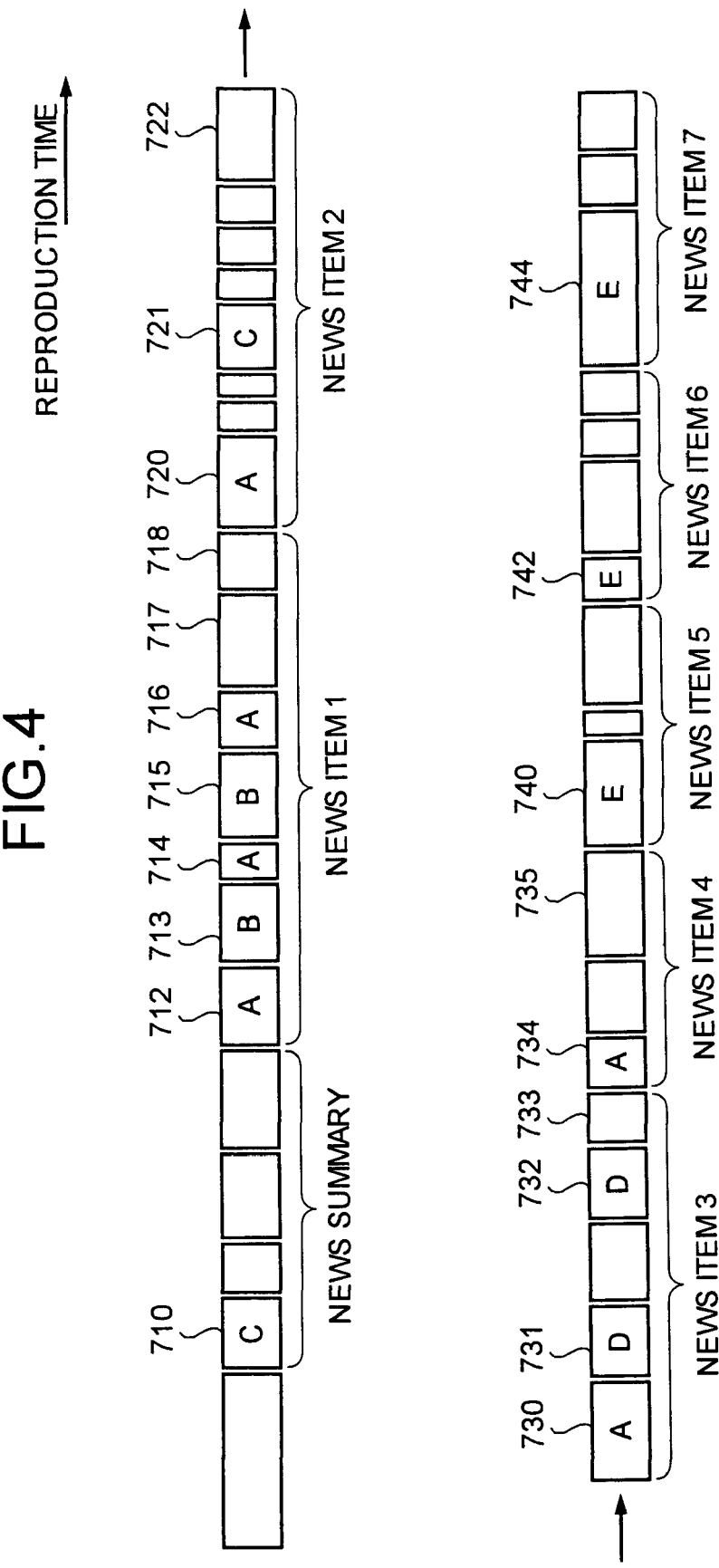
FIG. 4 is a schematic diagram of a news program.

FIG. 4 is a schematic diagram of a news program. The horizontal axis denotes the time axis. The news program is reproduced from the upper stage to the lower stage. FIG. 5 depicts the content of shots belonging to the respective groups. The group A shows the shot of an anchorperson. The group B shows a shot in which a special correspondent residing in Washington D.C. appears. The group C shows the shot in which the Prime Minister making statements appears. The group D shows an image shot of a prefectural office building. The group E shows a shot of the anchorperson captured from another camera angle.

A metashot starting from the beginning of the news program is a news summary shot for introducing the summary of the news program. The news summary shot includes a headline C shot 710 of a content of "confused discussion in Budget Committee", being a second news item described later. The C shot 710 is an image of the profile of the Prime Minister making statements.

Subsequently, a metashot corresponding to the topics on the United States Congress, being the first news item, exists between shots 702 and 707.

An A shot 712 shows an image in which the anchorperson gives an address and announces the lead portion of the first news item. Subsequently, a scene follows in which the B shot and the A shot are alternately arranged (from 713 to 716). This is a scene in which the special correspondent residing in Washington D.C. and the anchorperson talk on live connection. After the conversation, two shots (717 and 718) of images of the United States Congress are inserted, to finish the news item.

Subsequently, a metashot corresponding to the second news item exists between A shots 720 and 722. In the metashot corresponding to the second news item, a shot of the Diet Building and a shot of the conference room for the Budget Committee are arranged after the A shot 720.

A C shot 721 is also arranged following these shots. The C shot 721 is the same shot as the C shot 710 included in the metashot in the news summary.

A metashot corresponding to a third news item exists between A shots 730 and 733. The third news item reports a revenue deficit in a certain local government. This news includes a reporting scene including D shots 731 and 732 of a prefectural office building.

A metashot corresponding to a fourth news item exists between A shots 734 and 735. The news item starting from E shots 740, 742, and 744 are respectively for exchange and stock market, weather forecast, and ending.

In the news program having such contents, the metashot lead group determination unit 105 specifies the lead group based on, for example, the number of shots belonging to a group, that is, the frequency. Specifically, the metashot lead group determination unit 105 specifies a group agreeing with the condition of "the number of appearance is equal to or more than three times" as the lead group. Thus, a group appearing at a predetermined frequency or more is specified as the lead group. As a result, in the news program explained above with reference to FIGS. 4 and 5, the group A is specified. A desired group can be specified in this manner.

Alternatively, since the anchorperson does not appear many times, when the anchorperson appears a predetermined frequency or less, that group may be specified as the lead group.

The lead group may be specified under a condition that "the shortest length of the shots belonging to the same group is equal to or more than 10 seconds", that is, the shortest length of the shots belonging to the same group is equal to or more than a predetermined value. Further, the lead group may be specified under a condition that "the longest length of the shots belonging to the same group is equal to or more than 21 seconds", that is, the longest length of the shots belonging to the same group is equal to or more than a predetermined value.

Further, the lead group may be specified under a condition that "the mean value of the length of shots belonging to the same group is equal to or more than 12 seconds", that is, the mean value of the length of shots belonging to the same group is equal to or more than a predetermined value.

In the news program explained above with reference to FIGS. 4 and 5, the group A is specified from the statistical information explained with reference to FIG. 2, according to the condition that "the longest length of the shots belonging to the same group is equal to or more than 21 seconds".

The lead group may be specified based on the length of from the start time of the first shot to the finish time of the last shot belonging to the group, that is, distribution. Specifically, a group agreeing with the condition that "the distribution is equal to or more than 3 minutes" is specified as the lead group. Under this condition, the group A and the group C are specified.

In this case, in order to exclude a group including a special appearance, such as the group C appearing at the beginning, by changing the condition of "distribution" to "'distribution' of shots appearing after the second position in the same shot group", the lead group can be accurately specified.

As another example, "'distribution' excluding a shot away from a mean reproduction time in arrangement by equal to or more than the time obtained by calculating a position where a shot belonging to the same shot group is reproduced, that is, dispersion in arrangement, and multiplying the dispersion by a certain coefficient" may be used as the condition.

A non-inclusion group may be used as the condition. As a result, the group A and the group C can be specified.

The conditions under which the metashot lead group determination unit 105 selects the lead group is explained, but the lead group may be specified based on one or two or more conditions selected from the above conditions.

Prior to the input of the moving picture to the moving picture acquisition unit 101, or at the time of input thereof, the analysis parameter receiver 190 may receive conditions (parameters) required for the respective processing of the cut detector 102, the similar shot detector 104, the metashot lead group determination unit 105, and the metashot lead time determination unit 106, and may supply these conditions to these detectors and determination units.

For example, in the electronic program guide service referred to as EPG or iEPG, the program contents, broadcasting channels, and start and finish time are provided on the Internet. Likewise or alternatively, as a part of the EPG or iEPG information, when there is a service for providing an analysis parameter on the Internet, the moving picture processor of the present invention can change the parameters for detection and determination, corresponding to the recorded program.

Specifically, when a certain TV variety show in which similar title screens are always inserted at an every transition point between the topics is input, the moving picture processor of the present invention downloads the parameter setting peculiar to the program before recording or during recording from the Internet. The moving picture processor of the present invention can create a metashot for each topic more accurately, by using the downloaded condition of "similar shots appearing three times or more, and the minimum interval of appearance being two minutes or more".

The download means of the analysis parameter is not limited to the Internet. For example, when new programs have come out, such as in the middle of April or October, optimum analysis parameter setting for each program may be supplied in the form of a compact disc read-only memory (CD-ROM) or a memory card. The analysis parameter receiver 190 reads the optimum analysis parameter setting corresponding to the program from a recording medium, when the program is input to the moving picture processor, and may supply the setting to the respective detectors and determination units. Alternatively, the optimum parameter recorded on the recording medium may be copied to a recording area (not shown) in the processor, and when the program is input to the processor, the analysis parameter receiver 190 may read the optimum parameter from the recording area, and supply the parameter to the respective detectors and determination units.

Figure 6:
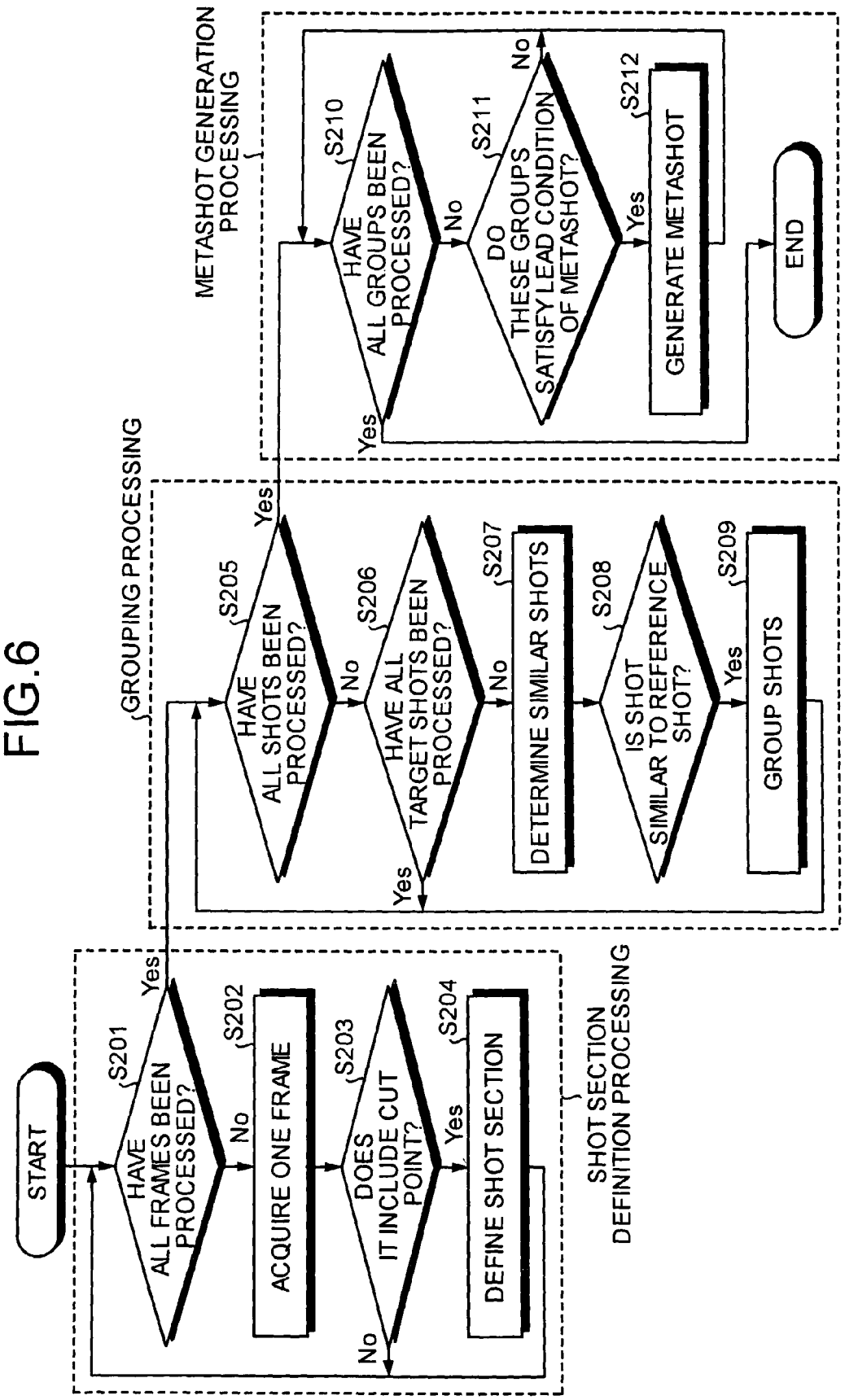
FIG. 6 is a flowchart of a moving picture processing in the moving picture processor.

FIG. 6 is a flowchart of the moving picture processing in the moving picture processor 10. The moving picture processing mainly includes three processing, that is, shot section definition processing, grouping processing, and metashot generation processing.

The shot section definition processing is performed first. In other words, the cut detector 102 acquires and inputs the image frame one by one (step S202). The cut detector 102 calculates the similarity between the image frame acquired immediately before the image frame acquired at step S202 and the image frame acquired at step S202, and detects a cut point based on the similarity.

When the acquired image frame includes the cut point (step S203, Yes), the shot section definition unit 103 defines the section from the cut point to the cut point immediately before as a shot section (step S204).

The processing from steps S202 to S204 is repeated. When the definition of shot sections for the whole image (program) has finished (step S201, Yes), the shot section definition processing finishes, to proceed to the grouping processing.

The similar shot detector 104 selects a predetermined shot as a reference shot, and determines the similarity between the shot and a target shot to be compared (step S207). When the similar shot detector 104 determines that the target shot is similar to the reference shot (step S208, Yes), the grouping unit 110 allocates a label for identifying the same group to the target shot and the reference shot. That is, the target shot and the reference shot are grouped (step S209).

The processing from steps S207 to S208 is repeated for all target shots with respect to one reference shot. When the processing finishes with respect to all target shots (step S206, Yes), the reference shot is changed, to repeat the processing at steps S207 and S208.

When the similarity determination processing between the reference shot and the target shot finishes for the whole image (step S205, Yes), the grouping processing finishes, to proceed to the next metashot generation processing.

The metashot lead group determination unit 105 specifies the lead group based on the statistical information held by the statistic storing unit 122. The metashot starting time determination unit 106 defines the metashot starting time based on the lead group specified by the metashot lead group determination unit 105. When the group to be processed agrees with the condition of the lead group (step S211), the metashot generator 107 generates a metashot having the group as the lead shot (step S212).

The processing at steps S211 and S212 is repeated. When generation of the metashots for the whole image finishes (step S210, Yes), the metashot generation processing finishes to finish the moving picture processing. When the analysis parameter reception step (not shown) exists, detection and determination processing at steps S203, S207, and S211 may be performed, by using the optimum parameter setting for each program received from the Internet or the like at the analysis parameter reception step, before or during the processing.

The moving picture processor 10 according to the first embodiment specifies the lead shot based on the appearance pattern of the shots belonging to the same group, and hence generation of too small metashots smaller than required can be avoided. As a result, search and the like of a predetermined scene by a user can be facilitated.

The moving picture processing by the moving picture processor 10 includes three processing, (1) shot section definition processing, (2) grouping processing, and (3) metashot generation processing (parts enclosed by broken line in FIG. 6). In this embodiment, after (1) shot section definition processing finishes with respect to all shots included in the moving picture, control proceeds to (2) grouping processing. Likewise, after (2) grouping processing finishes with respect to all shots included in the moving picture, control proceeds to (3) metashot generation processing. Instead of this, as another example, the three kinds of processing may be executed in parallel, while inputting the image, by providing a temporary storage area (not shown) in the moving picture processor.

For example, every time a new cut is detected, and the shot section is defined, determination of similar shots is performed with respect to the shot section and the past shot section, and an interim metashot may be generated based on the similar shot determination result to that extent. By executing the processing in parallel, after the end of the news program, the processing result can be obtained in a very short time.

Figure 7:
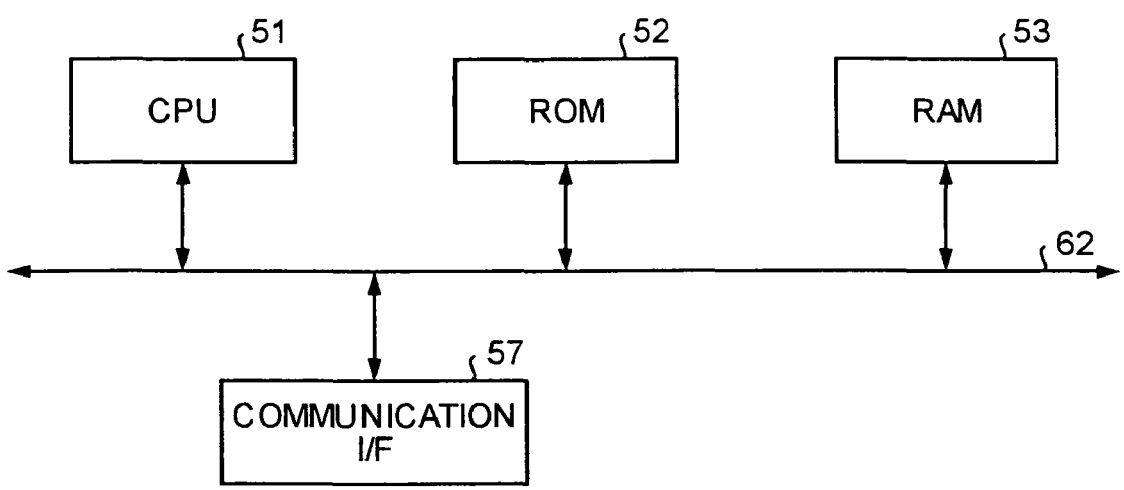
FIG. 7 depicts the hardware configuration of the moving picture processor.

FIG. 7 depicts the hardware configuration of the moving picture processor 10. The moving picture processor 10 includes, as hardware configuration, a ROM 52 that stores a program and the like for executing the moving picture processing in the moving picture processor 10, a central processing unit (CPU) 51 that controls the respective units in the moving picture processor 10 according to the program in the ROM 52 to execute the moving picture processing and the like, a random access memory (RAM) 53 in which a work area is formed and various kinds of data required for the control of the moving picture processor 10 are stored, a communication I/F 57 for connecting the moving picture processor 10 to a network to perform communication, and a bus 62 for connecting the respective units.

The moving picture processing program for executing the moving picture processing in the moving picture processor 10 is recorded in a computer readable recording medium such as a CD-ROM, a floppy disk (FD), and a digital versatile disk (DVD) in an installable format or an executable format and supplied.

Further, the moving picture processing program in this embodiment may be provided by storing it on a computer connected to a network such as the Internet and downloading via the network.

In this case, the moving picture processing program is read from the recording medium and executed by the moving picture processor 10, to be loaded onto a main storage, so that the respective units explained in the software configuration are created on the main storage.

The moving picture processor 10 according to a second embodiment will be explained. The moving picture processor 10 according to the second embodiment specifies a shot, which is not the lead shot in a metashot, such as the A shots 714 and 716 in the news item 1 in the news program shown in FIG. 4, based on a metric of conversation interactivity. Here, conversation interactivity is a value indicating the appearance frequency of a shot within predetermined time, including a shot to be determined whether to be the lead shot. The conversation interactivity will be explained later in detail.

Figure 8:
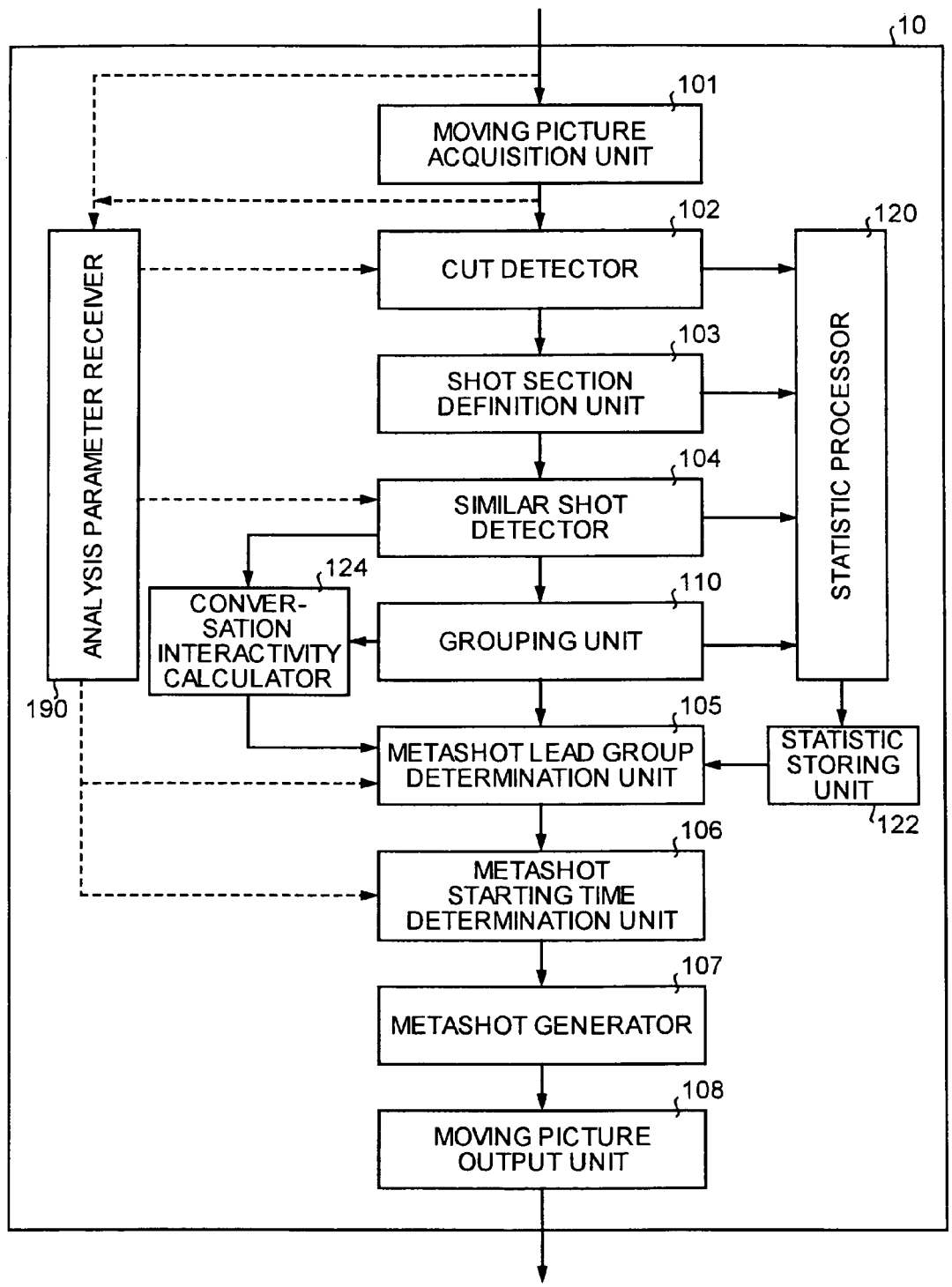
FIG. 8 is a block diagram of the functional configuration of a moving picture processor according to a second embodiment.

FIG. 8 is a block diagram of the functional configuration of the moving picture processor 10 according to the second embodiment. The moving picture processor 10 according to the second embodiment further includes a conversation interactivity calculator 124, in addition to the functional configuration of the moving picture processor 10 according to the first embodiment. The conversation interactivity calculator 124 calculates conversation interactivity metric based on the information acquired from the shot section definition unit 103, the similar shot detector 104, and the grouping unit 110. The metashot lead time determination unit 106 specifies a shot to be the head of the metashot, based on the conversation interactivity calculated by the conversation interactivity calculator 124.

The conversation interactivity calculator 124 according to this embodiment constitutes the conversation interactivity calculator, the reference range specifying unit, the shot time length calculator, the first number-of-shot calculation unit, and the second number-of-shot calculation unit of the present invention.

FIG. 9 depicts scenes from shots 711 to 720, that is, conversation scenes between the anchorperson and a special correspondent. The processing in which the conversation interactivity calculator 124 calculates the conversation interactivity used at the time of studying whether the A shot 714 is the head of metashot, will be explained with reference to FIG. 9.

The range from the time in the middle of the A shot 714, being the target, to the time away therefrom back and forth by specified time (for example, 1 minute or 30 seconds) is designated as a reference range, and shots existing in the reference range are extracted. In the moving picture shown in FIG. 9, shots 711 to 717 are extracted. In this embodiment, a shot such as a part of the shot is included in the reference range, such as shot 711 and shot 717, is also extracted. A shot belonging to any group is then extracted from shots 711 to 717.

The percentage of total time of the shots belonging to the group with respect to the total time of shots 711 to 717 is then calculated. The percentage of the total time of the shots belonging to the group is the conversation interactivity metric.

In the moving picture shown in FIG. 9, the shots belonging to any group are shots 712 to 716. Therefore, the result obtained by dividing the total time from shot 712 to shot 716 by the total time from shot 711 to shot 717 is the conversation interactivity metric with respect to shot 714, and in the moving picture shown in FIG. 9, the conversation interactivity metric becomes 0.88.

As in the conversation scene between the anchorperson and the special correspondent shown in FIG. 9, high conversation interactivity is calculated with respect to an A shot arranged in the news item. Therefore, shots other than the lead shot can be excluded by not selecting a shot having the conversation frequency equal to or larger than a certain value as the lead shot. That is, the metashot starting time determination unit 106 acquires the conversation interactivity from the conversation interactivity calculator 124, and when the acquired conversation interactivity is smaller than the certain value, specifies the shot as the lead shot.

The calculation processing of the conversation interactivity is not limited to the above embodiment. In this embodiment, the percentage of the shots belonging to a group is calculated, by designating a range from the time in the middle of a target shot to the position away therefrom back and forth by specified time as the reference range, but the reference of the specified time may not be the time in the middle of the shot. For example, the former position timewise (on the head side of the program) may be a position away from the start time of the target shot by specified time. Further, the following position timewise (the finish side of the program) may be a position away from the finish time of the target shot by specified time.

In this embodiment, when a part of the shot is included in the reference range, the shot is extracted. However, instead, only a shot in which the whole shot is included in the reference range may be extracted. As another example, when a part of the shot is included in the reference range, only the reproduction time length of the part included in the reference range may be made the target of the conversation interactivity calculation.

In this embodiment, "the percentage of shots belonging to any group" is calculated, but instead, "the percentage of shots belonging to a group where all shots exist in the reference range" may be calculated. In other words, when the shot belonging to the group is arranged outside the target reference range, the shot belonging to the group is not a target for calculation of the percentage.

In this embodiment, the percentage of the reproduction time length is calculated, but instead, the percentage of number of shots may be calculated. Specifically, the number of all shots included in the reference range is calculated. The number of shots included in the reference range and belonging to any group is also calculated. The percentage of the number of shots belonging to the group with respect to the number of all shots is then calculated. This percentage is the conversation interactivity. In the example shown in FIG. 9, the number of shots belonging to any group is 5, and the number of shots included in the reference range is 7. Therefore, the conversation interactivity in this case is 5/7.

As another conversation interactivity calculation method, the number of shots included in the reference range and belonging to any group may be divided by the length of the reference time. This numerical value expresses the number of shots concerned with conversation per unit time. In the example shown in FIG. 9, it is 5 (number)/50 (sec)=0.1 (number/second).

As still another conversation interactivity calculation method, the product of the percentage of the reproduction time length and the number of shots concerned with conversation per unit time may be used. In the example shown in FIG. 9, it is 0.88×0.1=0.088. The conversation interactivity in this case increases with an increase in the number of shots engaging with conversation in the reference range, and increases as the time occupied by the shots engaging with conversation in the reference range becomes long. In other words, the conversation interactivity becomes a large value as more similar shots appear repetitively at a higher speed within the reference range, and can be expected to become an index indicating the vivaciousness of conversation.

In this embodiment, a certain shot is designated as a target, and the reference range centering on the shot is specified. However, instead, certain time may be designated as a target, and the reference range centering on the time may be specified.

FIG. 10 is a graph for explaining conversation frequency calculated by the calculation method explained with reference to FIG. 9. The horizontal axis of the graph shown in FIG. 10 indicates time. The vertical axis indicates conversation interactivity. The graph shown in FIG. 10 indicates the result of calculation with respect to an actual news program. 1001 corresponds to a part in which TV personalities discuss about a certain news item briefly in a studio. 1002 corresponds to a part in which a guest appears in the studio and has a discussion with a newscaster in an interview. 1003 corresponds to a sports segment. In 1003, a sports newscaster appears repetitively. In a part reporting a baseball game, shots of a pitcher and shots of batters appear repetitively as similar shots. This is because even if different batters and different pitchers appear, since the camera angle is the same, it is determined as a similar shot.

In the scene corresponding to 1002, since the newscaster as an interviewer appears repetitively within short time, all these shots may be specified as the lead shot. Therefore, in a section where for example the conversation interactivity becomes equal to or more than a specified value, the metashot starting time determination unit 106 may specify only the first shot of the shots in the metashot lead group included in the section as the lead shot. As a result, it can be suppressed that a large number of metashot lead shots are generated from the conversation scene. In the graph in FIG. 10, for example, the conversation interactivity 0.2 may be designated as the specified value.

When the calculation of the conversation interactivity is performed not in a unit of shot but in a unit of time, there may be an instance in which the time when the conversation interactivity reaches the specified range or is separated from the specified range does not agree with the shot boundary. In this instance, it is not always necessary that the metashot boundary agrees with the shot boundary.

For example, when the lead shot is detected, of the time at which the conversation interactivity becomes equal to or larger than the specified value, the time closest to the lead shot may be determined as the start time. Alternatively, of the time at which the conversation interactivity becomes equal to or lower than the specified value, the time closest to the lead shot may be determined as the start time.

Figure 11:
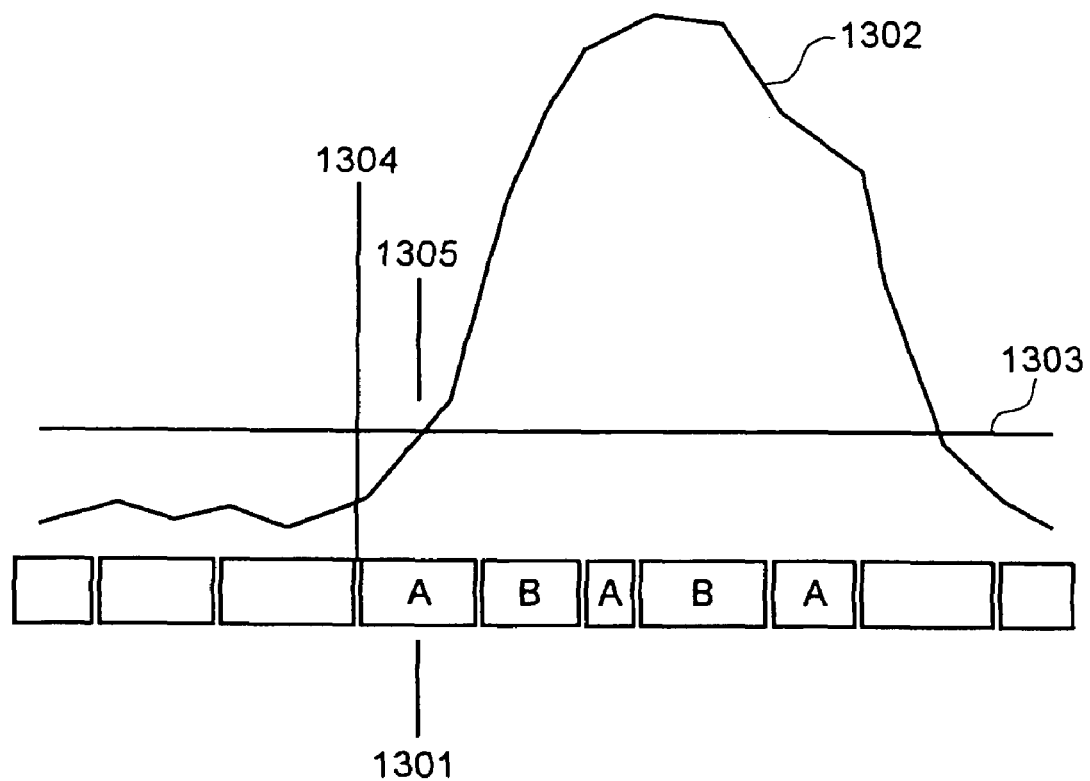
FIG. 11 is a schematic diagram of a lead shot and conversation interactivity metric with respect to the lead shot.

The determination method of the boundary time of the metashot will be specifically explained, with reference to FIG. 11. FIG. 11 schematically depicts the lead shot and conversation interactivity with respect to the lead shot.

1301 is the metashot lead shot determined in a unit of shot. 1302 indicates conversation interactivity. 1303 is a specified value for determining that a section in which the conversation interactivity is equal to or larger than the value is a conversation section.

In the lead shot shown in FIG. 11, the metashot starting time when the metashot is defined in a unit of shot is 1304. On the other hand, when the metashot is defined in a unit of time, the metashot lead time is 1305. Thus, when the conversation interactivity is calculated in a unit of time, the position different from the shot boundary of the metashot may be designated as the metashot starting time.

Figure 25:
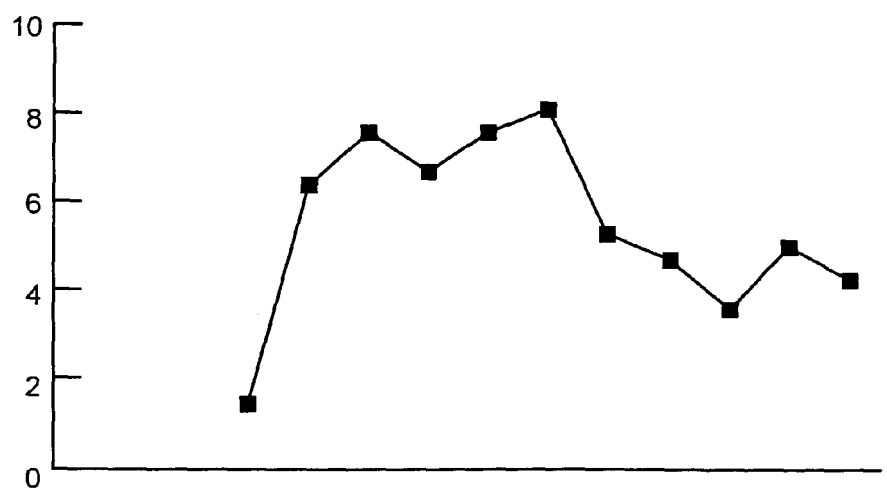
FIG. 25 is a schematic diagram of conversation section setting using the conversation interactivity metric.

Another method for defining the metashot will be exemplified. In FIG. 25, names of groups (A, B, C) are shown, which are grouped according to the duration of respective shots and similar shots, with respect to the 61st shot to the 74th shot in the moving picture. In the column of "conversation intearctivity", the product of the percentage of reproduction time length with respect to the reference range and the number of shots concerned with conversation per unit time is shown. The "reference range" herein shows conversation interactivity when the section from shot 61 to shot 61 is designated as the reference range for the column of shot number 61, when the section from shot 61 to 62 is designated as the reference range for the column of shot number 62, and when the section from shot 61 to 74 is designated as the reference range for the column of shot number 74. Here, for convenience, the unit of numerical value is a reciprocal of minute, and one obtained by dividing the numerical value by 60 becomes the reciprocal unit of second.

For example, When observing only the section from shots 61 to 64, the shots repetitively appearing in this section are only shots 62 and 64 belonging to the group B, and the total time of these is 9 seconds. Since the total time from shot 61 to shot 64 is 27 seconds, the conversation interactivity becomes 1.5 ((9 seconds÷27 seconds)×(2 shots÷27 seconds)×60 sec./min.=1.5).

In this manner, when the reference range is extended, the conversation interactivity becomes largest in the section till shot 69, when the shot 61 is designated as the starting shot. If the minimum value of conversation interactivity that can be regarded as a conversation section is predetermined as for example 2, the conversation interactivity 8.1 from shot 61 to shot 69 exceeds this value. Therefore, the metashot starting time determination unit 106 sets the section from shot 61 to shot 69 as the conversation section.

The metashot starting time determination unit 106 may directly set the thus set conversation section as a metashot, and set the start time of the lead shot in the metashot as the metashot lead time, or may set a shot at the head or end in the conversation section as the head of the metashot. Further, a shot belonging to any similar shot group and appearing first or last in the conversation section may be set as the head of the metashot. Further, a shot belonging to a group determined as the metashot lead group by the metashot lead group determination unit 105 and appearing first or last in the conversation section may be set as the head of the metashot.

Figure 12:
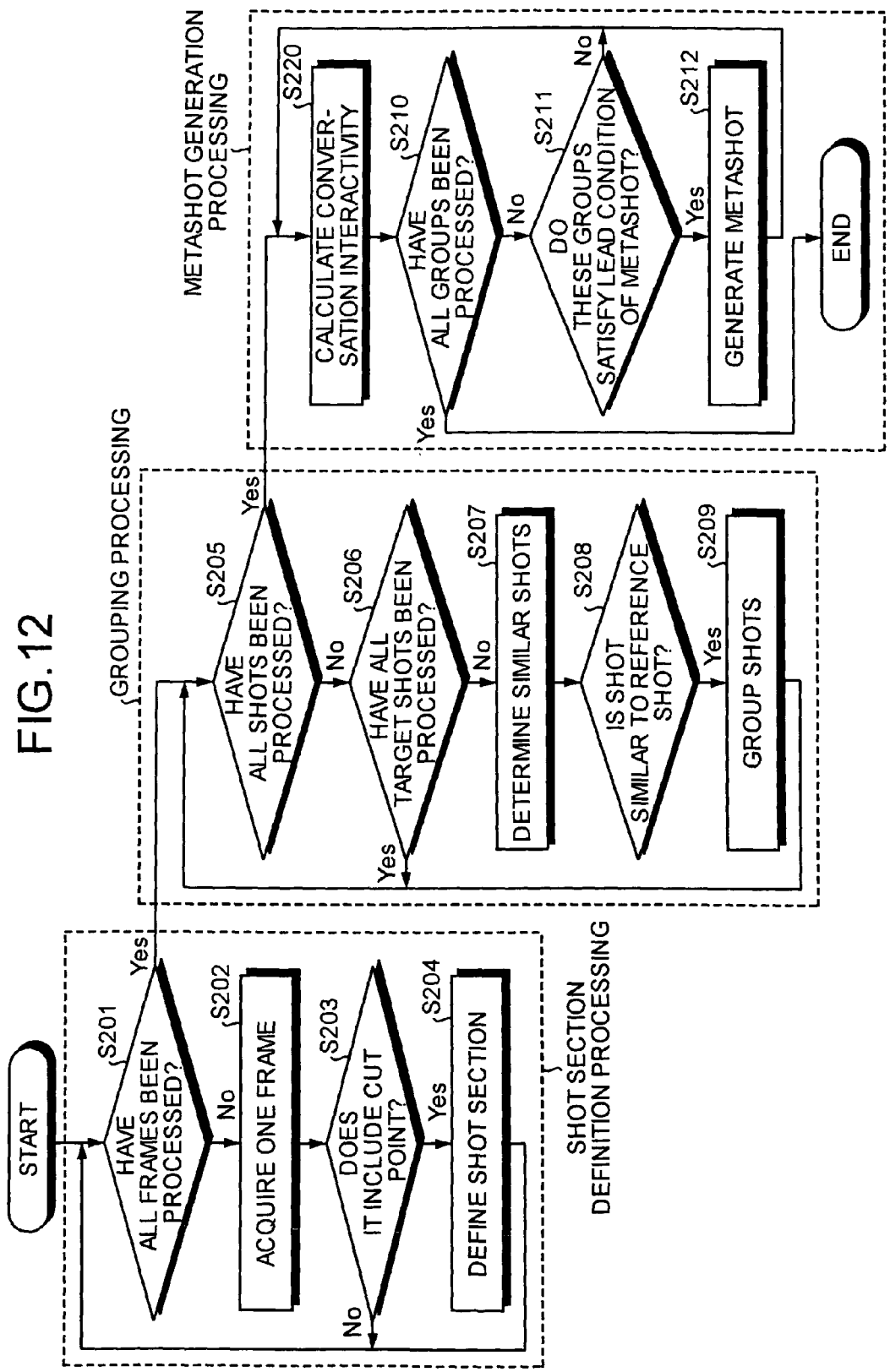
FIG. 12 is a flowchart of a moving picture processing by the moving picture processor according to the second embodiment.

FIG. 12 is a flowchart of the moving picture processing by the moving picture processor 10 according to the second embodiment. In the moving picture processor 10 according to the second embodiment, when the grouping processing finishes, the conversation interactivity calculator 124 calculates conversation interactivity of a shot to be processed, of the shots included in the lead group (step S220), and control proceeds to step S210. In the processing for specifying the lead shot (steps S211 and S212), the metashot starting time determination unit 106 specifies the lead shot based on the conversation interactivity calculated by the conversation interactivity calculator 124, and defines the start time of the specified lead shot as the metashot starting time.

The configuration and processing other than those explained above of the moving picture processor 10 according to the second embodiment are the same as those of the moving picture processor 10 according to the first embodiment.

Figure 5:
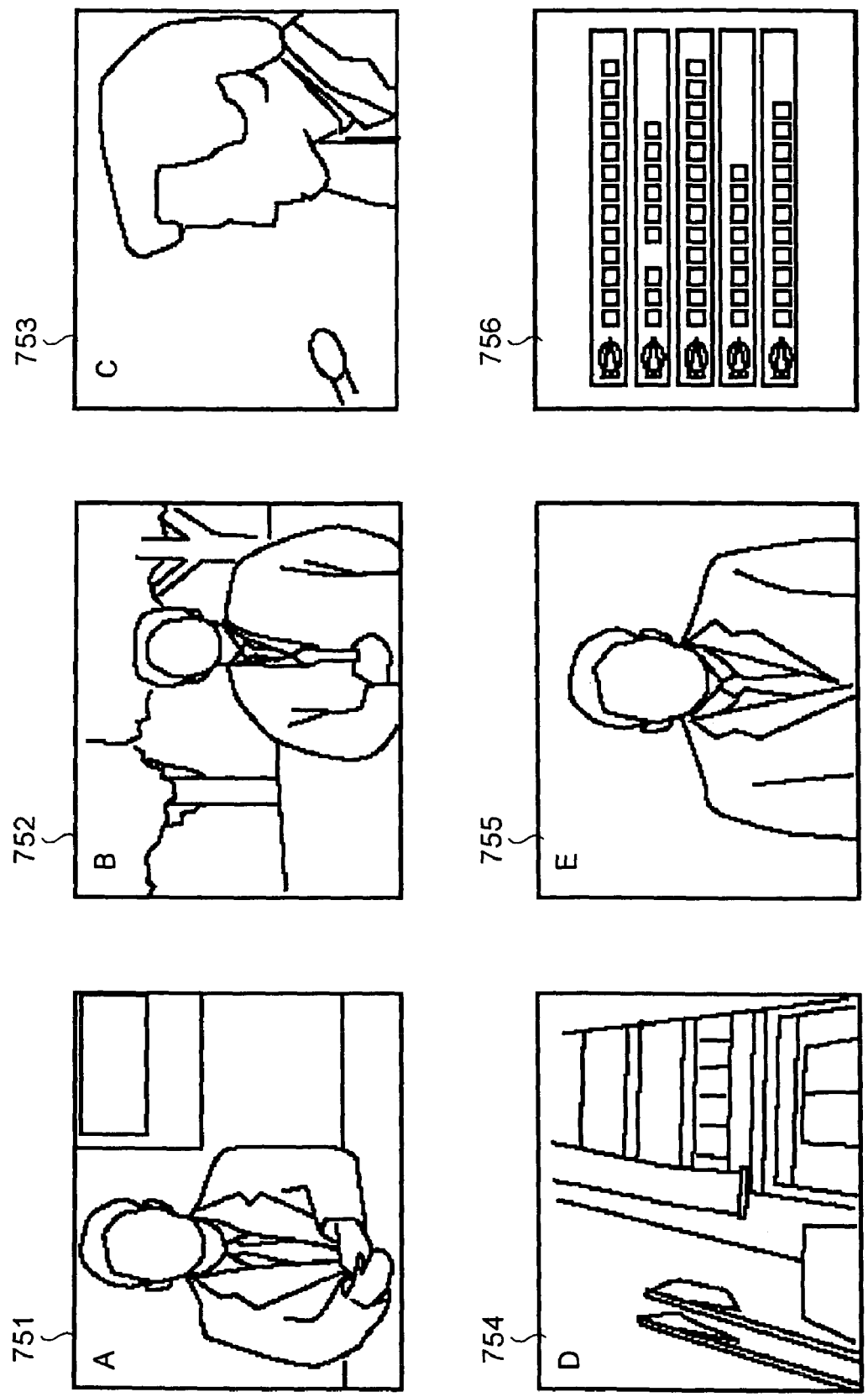
FIG. 5 depicts the content of shots belonging to respective groups.

When the lead shot is specified under a condition that the similar shots repetitively appear, a screen 756 in which news items are itemized as shown in FIG. 5 may be specified as the lead shot. A screen such as the screen 756 is often at a changeover between news items in the news program, as the anchorperson. Therefore, there is no problem even if such a screen is set as the lead shot. Therefore, the shot specified as the lead shot is not limited to the shot of an anchorperson.

TV variety shows and the like may be divided for each segment, by using the above-mentioned definition of the conversation section. This method will be explained below. FIG. 26 schematically depicts a similar shot appearing pattern of a program introducing general knowledge on a wide variety of subjects. In this program, talk of TV personalities in a studio and reporting video introducing the general knowledge appear alternately, and before the video introducing the general knowledge, the name of a person who has submitted the knowledge to the program is introduced.

In the studio conversation scene, the images of TV personalities appear alternately. In the reporting video part introducing the general knowledge, however, similar shots may hardly appear, or similar shots tend to appear only in one reporting video part introducing the general knowledge. Therefore, when the conversation section is defined by the above-mentioned method, studio talk parts reacting to the general knowledge and a partial section of the reporting video introducing the general knowledge become the conversation section.

Therefore, by selecting a similar shot group, which is not included at all (or included only a few times) in the conversation section, a characteristic shot can be selected for each segment, like "M" in FIG. 26. The similar shot M is a shot in which the name of the person who submits the general knowledge to the TV station is introduced, and a shot following a similar A shot which a chairperson introduces as "the knowledge on the next subject".

Since the similar shot M is not included in the conversation section 2501, if the conversation section 2501 is extended by one shot till the similar shot M following the conversation section 2501, the conversation interactivity decreases. Therefore, the conversation section 2501 is defined as shown in FIG. 26. As a result, the similar shot M does not belong to any conversation section.

By setting the shot belonging to the similar shot group, which does not belong to any conversation section, as the metashot lead shot, division for each segment becomes possible even in a TV variety show program. Further, when there is a plurality of similar shot groups, which do not belong to any conversation section, the similar shot group with which segmentation is done can be determined by using the time distribution and the mean length thereof.

The segment division in the TV variety show program by such a method can be also used in a certain type of quiz program. For example, in a program in which after watching a question video, respondents in a studio discuss about it, and then correct answer video is broadcasted, when fixed patterns such as "question" and "answer" are displayed respectively before the question video and the correct answer video on the whole screen, there is a high possibility that the shots of "question" and "answer" do not belong to the conversation section.

In the moving picture processor 10 according to the second embodiment, since the lead shot is specified based on the conversation interactivity, more appropriate metashot can be generated.

The moving picture processor 10 according to a third embodiment will be explained below. The moving picture processor 10 determines a program type of the acquired moving picture. Here, the program type refers to types such as news program, drama, and sports program.

Figure 13:
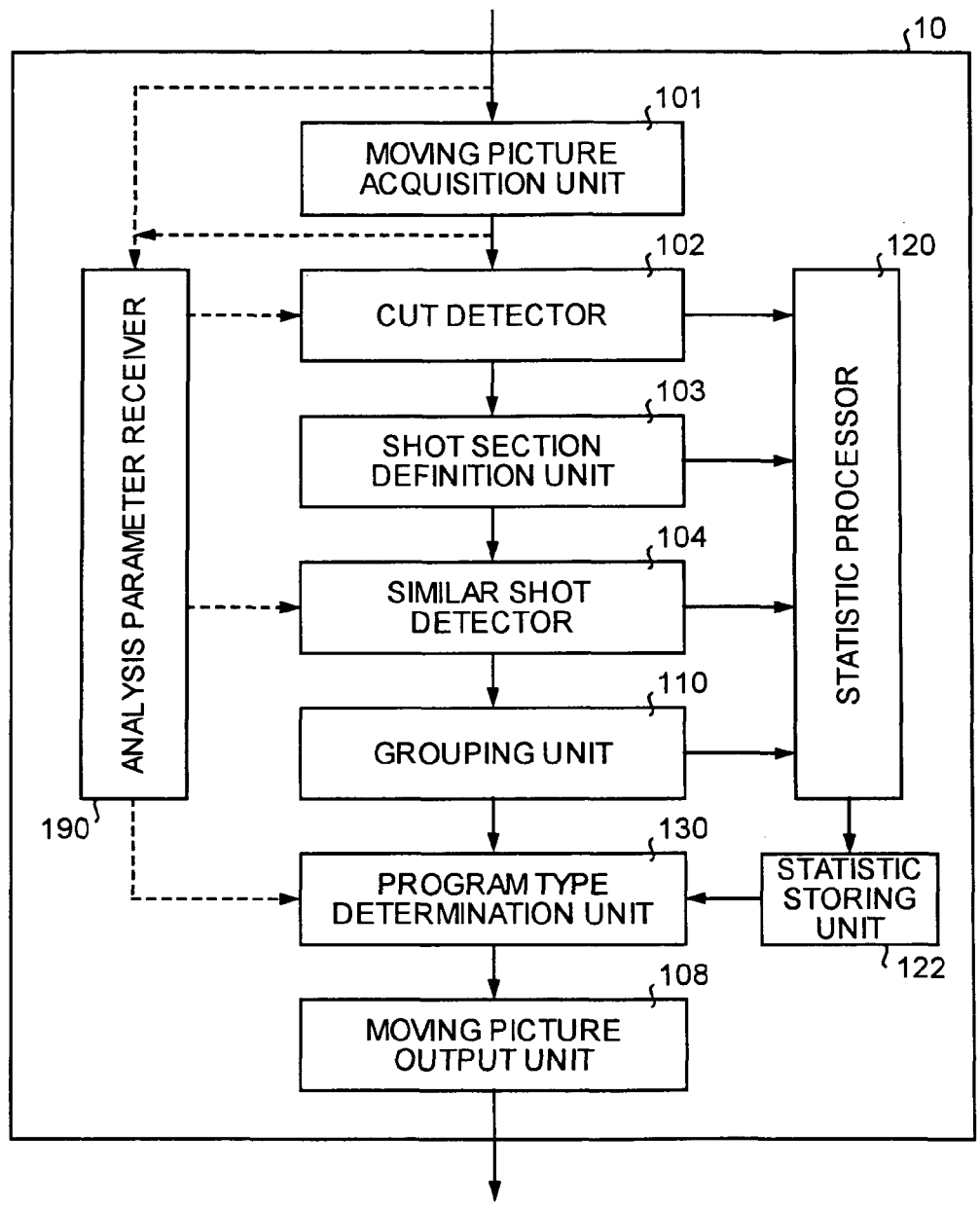
FIG. 13 is a block diagram of the functional configuration of a moving picture processor according to a third embodiment.

FIG. 13 is a block diagram of the functional configuration of the moving picture processor 10 according to the third embodiment. The moving picture processor 10 according to the third embodiment includes a program type determination unit 130, instead of the metashot lead group determination unit 105 and the metashot starting time determination unit 106 in the moving picture processor 10 according to the first embodiment. When the similar shots are grouped, the program type determination unit 130 determines the type of the input program based on the time distribution of similar shots. The program type information indicating the program type determined by the program type determination unit 130 is output from the moving picture output unit 108 to external equipment:

The external equipment having obtained the program type can perform processing according to the program type, based on the program type information. When the external equipment is a recording device such as a hard disk recorder, the program type information may be used for changing the bit rate in video recording, displaying the determined program type at the time of displaying the recorded program list, or automatic setting of determination parameter for cut detection or similar shot detection.

The program type determination unit 130 according to the third embodiment constitutes the shot number comparator, the shortest time length comparator, the longest time length comparator, the time length mean value calculator, the mean value determination unit, the reference mean time group number calculation unit, the shot interval time length measurement unit, the shot interval time length determination unit, the group calculation unit, the group presence range specifying unit, and the metashot specifying unit according to the present invention.

FIG. 14 schematically depicts statistical information held by the statistic storing unit 122 according to the third embodiment. The statistical information shown in FIG. 14 is generated by the statistic processor 120 with respect to an imaginary drama program.

Figure 15:
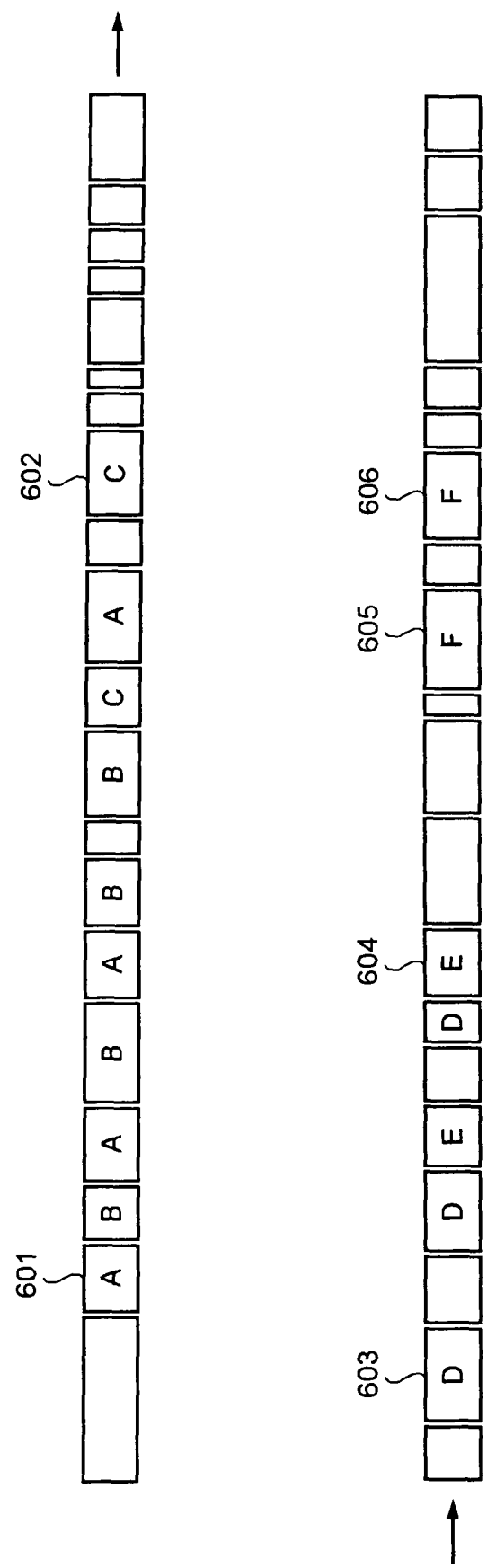
FIG. 15 is a schematic diagram of a drama program.

FIG. 15 schematically depicts the drama program. The horizontal axis is a time axis, as in the news program schematically shown in FIG. 4. The drama program is reproduced from the upper stage to the lower stage. The algorithm by which the program type determination unit 130 determines the program type will be explained in detail, with reference to FIG. 15.

The program type determination unit 130 determines whether a program is a news program, for example, based on whether "a group to be the lead shot in a metashot" exists. That is, when one or more groups to be the lead shot exist, the program is determined as a news program. When the group to be the lead shot does not exist, it is determined as a program other than the news program.

The processing for determining whether "a group to be the lead shot in a metashot" exists is similar to the processing for selecting a metashot lead group by the metashot lead group determination unit 105, explained in the first embodiment.

Specifically, processing for selecting a shot of an anchorperson in the news program is performed. That is, the metashot lead shot is determined based on conditions, such as the number of appearance of shots belonging to the similar shot group, the time length of the shortest shot, the time length of the longest shot, the mean time length of shots, and shots whose distribution time is within a certain range.

The processing for defining shots 601 and 602 in FIG. 15 as one metashot will be explained, with reference to FIG. 16. This procedure is also disclosed in a Non-Patent Literature 1: Journal by Information Processing Society of Japan, "Video Interface with Hierarchical Icons Using Repetitious Shot Detection" by Aoki, et al.

Figure 16:
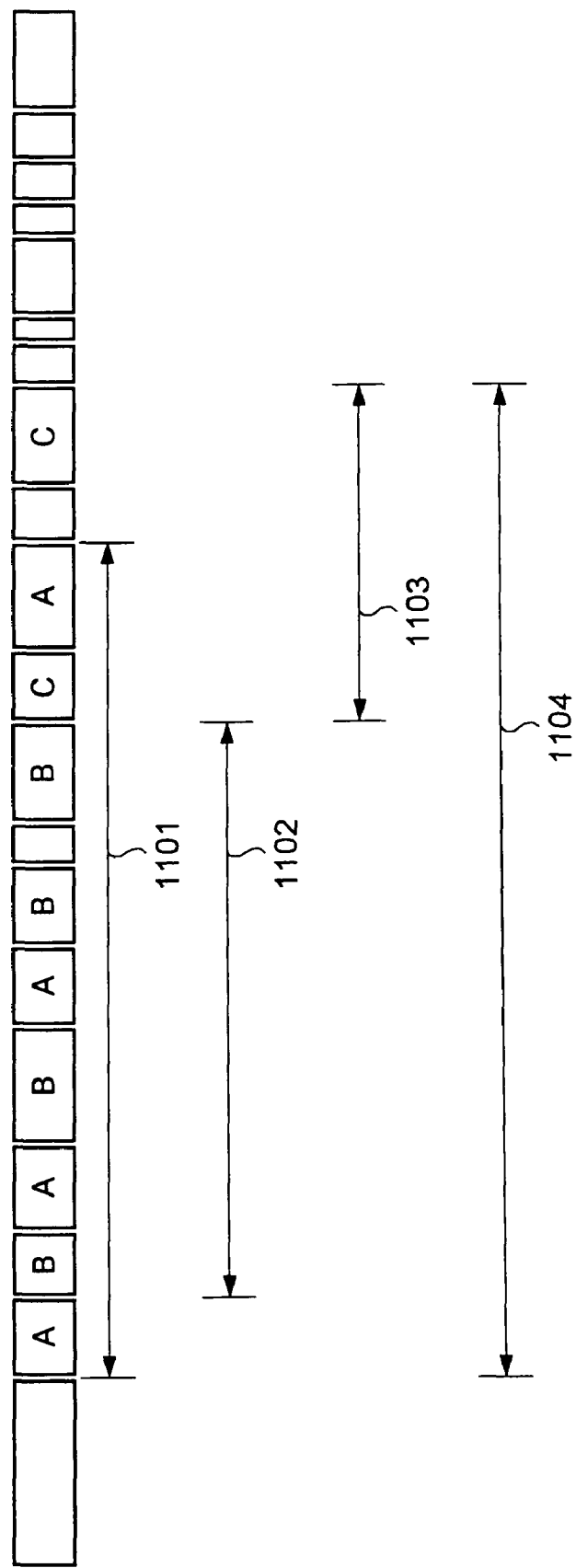
FIG. 16 is an explanatory diagram of a metashot definition processing.

In FIG. 16, the shots belonging to the group A of similar shots appear in a time range 1101. Likewise, the group B and the group C appear in time ranges 1102 and 1103. These time ranges are regarded as a set on the time axis, and by determining the sum of sets, a time range 1104 can be determined. By such processing, the time range 1104 (that is, from 601 to 602 in FIG. 16) can be defined as a metashot.

After the metashot is defined by the processing, the program type is determined based on the appearance pattern of the metashot.

Specifically, a group is selected, in which the reproduction time length of the shot belonging to the same group, whose reproduction time length is the shortest, is equal to or more than 10 seconds, that is, the reproduction time length of the shortest shot is equal to or larger than a predetermined value, and when the number of the selected groups is equal to or larger than 50% of the total group numbers included in the whole program, this program is determined as a drama.

In other words, a group in which the reproduction time length of the shortest shot is equal to or larger than a predetermined value is selected, and when the percentage of the number of selected groups with respect to the total group numbers included in the whole program is equal to or larger than a predetermined value, this program is determined as a drama.

As another example of determination conditions, the condition may be such that the time length of the shortest shot is equal to or larger than a predetermined percentage in the time length of the whole program, instead that the shortest time length of the shortest shot is equal to or larger than a predetermined value.

The condition may further be such that the percentage of the time length of the total shots belonging to the selected group with respect to the time length of the whole program is equal to or larger than a predetermined value, instead that the percentage of the number of selected groups with respect to the total number of groups included in the whole program is equal to or larger than a predetermined value. The condition may still further be such that the percentage of the number of appearance of the shots belonging to the selected group with respect to the number of shots in the whole program is equal to or larger than a predetermined value, instead that the percentage of the number of selected groups with respect to the total number of groups included in the whole program is equal to or larger than a predetermined value.

The program type is determined based on the number of appearance of the metashot in the whole program, the total value of the reproduction time of the metashot appearing in the whole program, the reproduction time length of the metashot, whose reproduction time length is the shortest, the reproduction time length of the metashot, whose reproduction time length is the longest, and the mean reproduction time length of metashots included in the moving picture. Thus, the program type can be determined based on the appearance pattern of the metashot.

Alternatively, a mean value of the reproduction time length of shots belonging to the same group may be calculated, the number of groups, in which the mean value is within the range of a predetermined reference mean time length may be counted, to determine the program type based on the counted number of groups. Thus, the program type may be determined based on the appearance pattern of the shots included in the metashot in the whole program.

As another example, a shot interval reproduction time length is measured between the shot arranged first and the shot arranged last in the program, of the shots belonging to the same group, the number of groups, in which the reproduction time length between shots has a value within the range of a predetermined reference shot interval reproduction time length, may be counted, to determine the program type based on the counted number of groups. In this case, for example, determination whether the program is a news program can be performed.

The program type may be determined based on one condition of these conditions, or may be determined based on the combination of a plurality of conditions selected from these conditions.

Prior to the input of the moving picture to the moving picture acquisition unit 101, or at the time of input thereof, the analysis parameter receiver 190 may receive conditions (parameters) required for the respective processing of the cut detector 102, the similar shot detector 104, and the program type determination unit 130, and supply these to the detectors and the determination unit. The analysis parameter receiver 190 may receive these parameters from the Internet or recording media as explained in the first embodiment.

Figure 17:
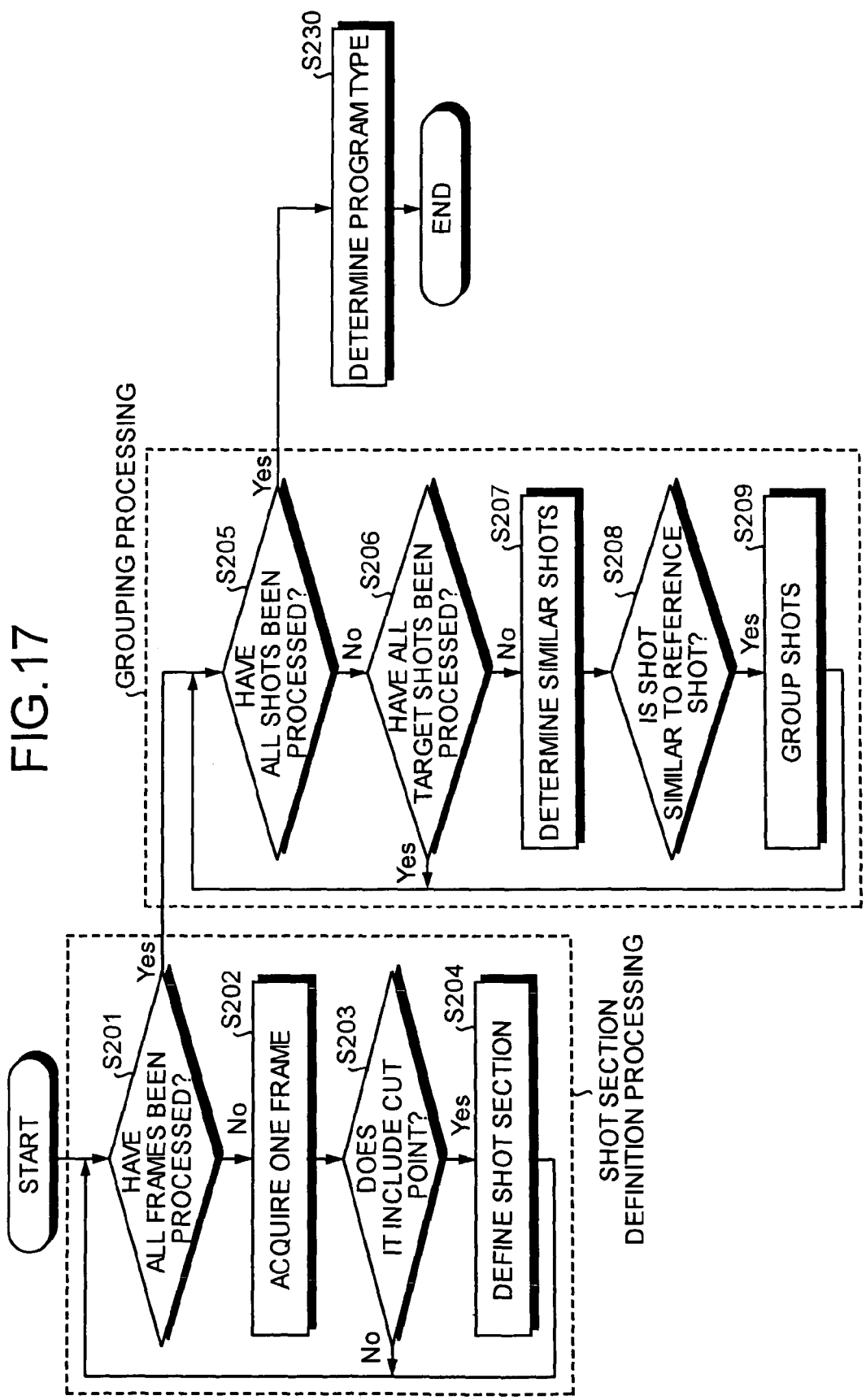
FIG. 17 is a flowchart of a moving picture processing in the moving picture processor according to the third embodiment.

FIG. 17 is a flowchart of the moving picture processing in the moving picture processor 10 according to the third embodiment. In the moving picture processing of the moving picture processor 10 according to the third embodiment, program type determination processing is performed (step S230), following to (1) shot section definition processing and (2) grouping processing. In the program type determination processing, the program type determination unit 130 determines the program type of the moving picture according to the above processing.

When the analysis parameter reception step (not shown) exists, detection and determination processing at steps S203, S207, and S230 may be performed, by using the optimum parameter setting for each program received from the Internet or the like at the analysis parameter reception step, before or during the processing.

The configuration and processing other than those explained above of the moving picture processor 10 according to the third embodiment are the same as those of the moving picture processor 10 according to the first embodiment.

The moving picture processor 10 according to the third embodiment can determine the program type based on the appearance pattern of the similar shots as explained above, thereby enabling improvement in the efficiency of viewing, searching, and editing of images. Further, when processing the moving picture of the program, appropriate processing according to the determined program type can be performed.

Figure 18:
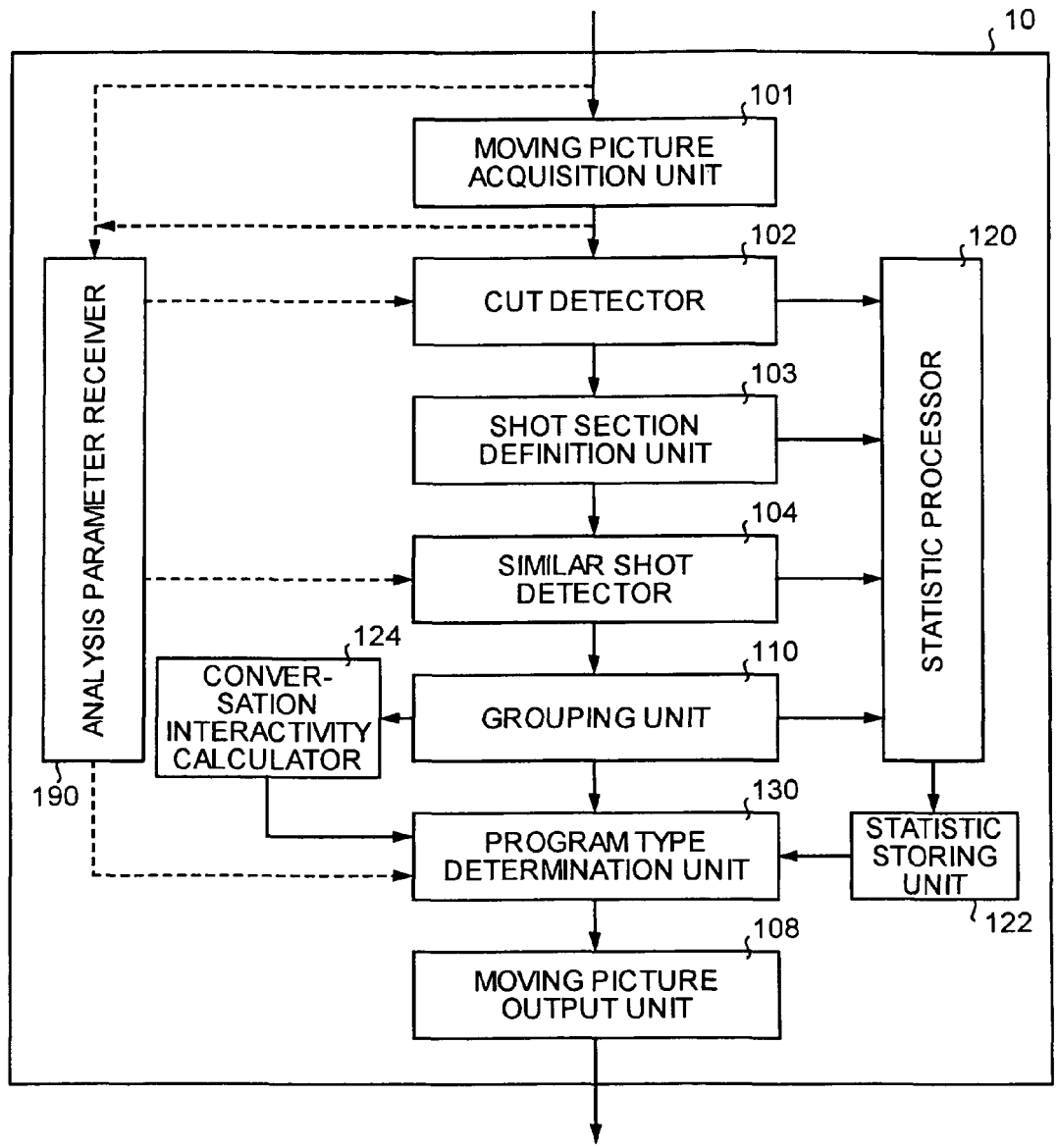
FIG. 18 is a block diagram of the functional configuration of a moving picture processor according to a fourth embodiment.

The moving picture processor 10 according to a fourth embodiment will be explained below. The moving picture processor 10 according to the fourth embodiment defines a metashot by using conversation interactivity. FIG. 18 is a block diagram of the functional configuration of the moving picture processor 10 according to the fourth embodiment. The moving picture processor 10 according to the fourth embodiment includes the conversation interactivity calculator 124 in addition to the functional configuration of the moving picture processor 10 according to the third embodiment. The program type determination unit 130 determines the program type based on the conversation frequency calculated by the conversation interactivity calculator 124.

Figure 19:
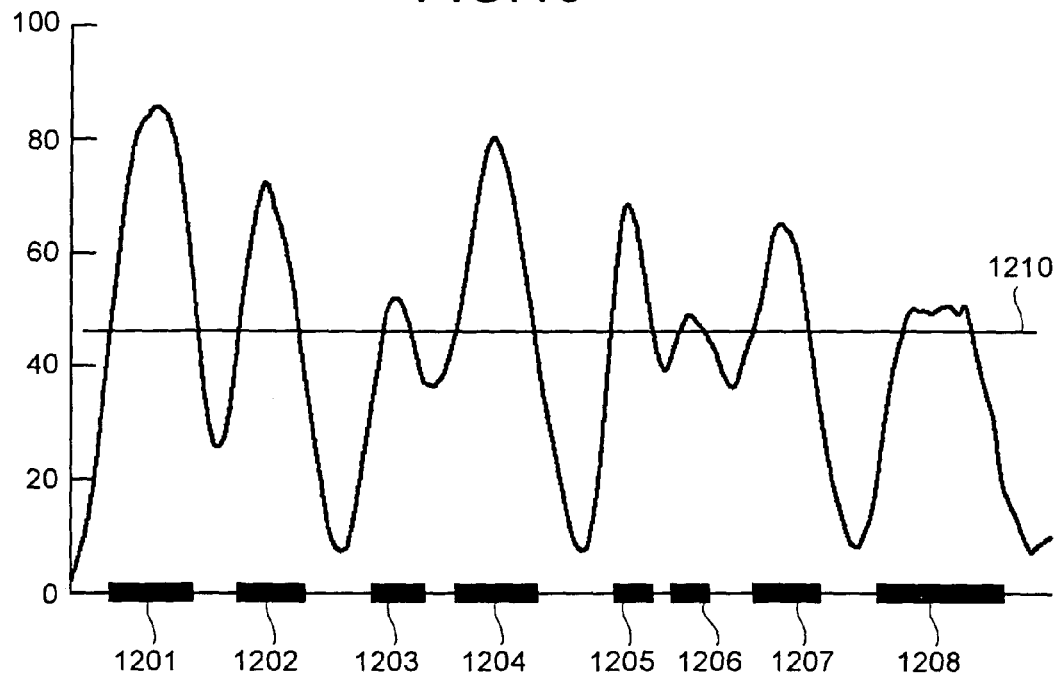
FIG. 19 is a graph for explaining the conversation interactivity metric calculated with respect to an actual quiz program.

FIG. 19 is a graph for explaining the conversation interactivity calculated with respect to an actual quiz program, as in FIG. 10. For the sake of explanation, a slight modification is added. The parts of black belts 1201 to 1208 on the horizontal axis are scenes where a chairperson and respondents are talking in a studio.

In this program, an opening video and a first questioning video are broadcasted before the black belt 1201. Subsequently, a scene in which the TV personalities answer the question in the studio, a scene in which the correct answer video is broadcasted, a scene in which a comment is given in the studio, and a scene in which the next questioning video is broadcasted follow sequentially.

From the graph in FIG. 19, it is seen that the conversation interactivity is high in the studio scene, and is low in the opening, the questioning video, and the correct answer video. This is because in the sections of the opening, the questioning video, and the correct answer video, similar shots tend to not appear. Therefore, a threshold 1210 is set, and a section in which the conversation interactivity is equal to or higher than the threshold can be determined as the metashot of the studio scene.

The program may be presumed as a "drama/movie", under a condition that the sections in which the conversation interactivity is equal to or higher than the threshold are present in a predetermined number.

As another example, the total time length of the metashot in which the conversation interactivity becomes equal to or higher than the threshold is calculated, and when the calculated value is within a predetermined specified range, the program may be presumed as a "drama/movie".

As another example, a condition that the time length of the longest metashot is within a specified range, or a condition that the mean time length of the metashots is within a specified range may be used.

Further, in sports telecast programs such as sumo wrestling, baseball, and tennis, broadcasting is performed by combining images captured by a plurality of fixed cameras. Therefore, similar shots appear over the whole program.

Therefore, for example, when a program does not agree with the condition for presuming a news program explained in the third embodiment, and similar shots appear in the time range in more than half the program, the program may be presumed as a sports program.

The determination method of the program type is not limited to the above method. An example of a method for determining the program type by determining the conversation interaction with respect to the whole program will be explained below.

FIG. 27 is a graph in which the conversation interaction of the whole program is determined with respect to nine news programs and twelve TV variety show programs, wherein a white square denotes a TV variety show program, and a black square denotes a news program. The conversation interaction is plotted on the horizontal axis. On the vertical axis is plotted a percentage obtained by dividing the time at which the first segment title appears by the length of the whole program, at the time of applying the method for segment-dividing the TV variety show program in the second embodiment to all programs (including news). The conversation interaction is expressed by a logarithmic scale for easiness of observation.

As seen from FIG. 27, there is a clear tendency in the conversation interactivity in the whole program of the news program and the talk show program. Therefore, the news program (region A) and the TV variety show program (regions B and C) can be discriminated, by using an appropriate conversation interactivivty as a threshold.

In three programs in the region C in the TV variety show program, the segment title screen appears repetitively for each segment, and a tendency of appearing in the lower part in the scale on the vertical axis can be observed. Therefore, by setting an appropriate threshold for the time when the segment title appears, the TV variety show programs can be discriminated between one in which it is appropriate to divide the program for each segment and one in which it is not appropriate to divide the program for each segment.

The program type may be determined based on the time distribution of the similar shots, and the specific conditions are not limited to those shown in the embodiment.

Figure 20:
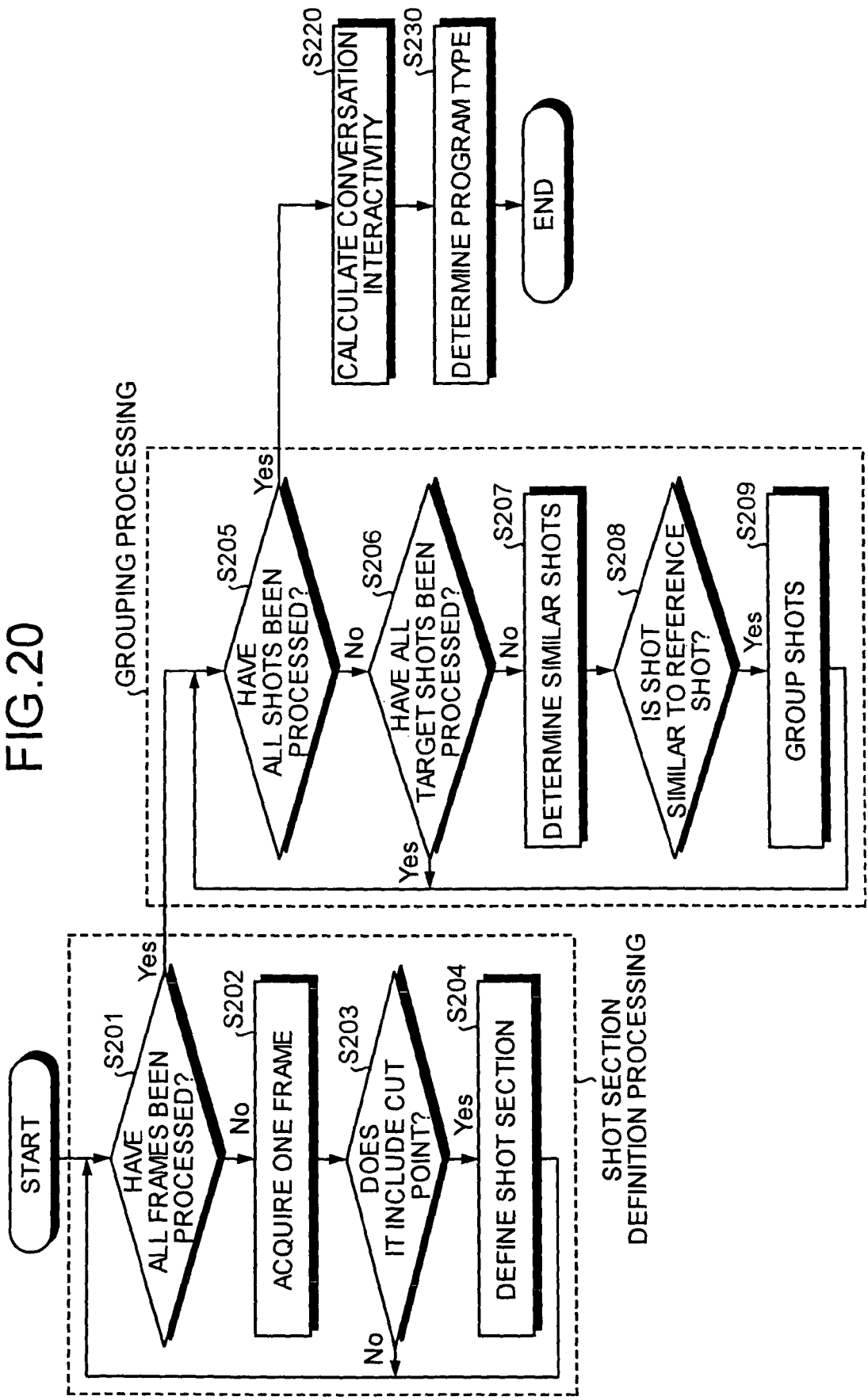
FIG. 20 is a flowchart of a moving picture processing by the moving picture processor according to the fourth embodiment.

FIG. 20 is a flowchart of the moving picture processing by the moving picture processor 10 according to the fourth embodiment. In the moving picture processing according to the fourth embodiment, conversation interactivity calculation processing (step S220) is performed immediately before the program type determination processing (step S230) explained in the third embodiment. The conversation interactivity calculation processing by the conversation interactivity calculator 124 is as described above.

The configuration and processing other than those explained above of the moving picture processor 10 according to the fourth embodiment are the same as those of the moving picture processor 10 according to the third embodiment.

The moving picture processor 10 according to a fifth embodiment will be explained. The moving picture processor 10 according to the fifth embodiment divides the moving picture into a plurality of small sections, and determines the program type for each small section. Here, the small section refers to a section simply divided by a certain time length, such as 3 minutes or 30 seconds, from the beginning of the moving picture. As another example, the small section may be a section divided by a certain number of shots, such as continuous 3 shots or 10 shots.

Figure 21:
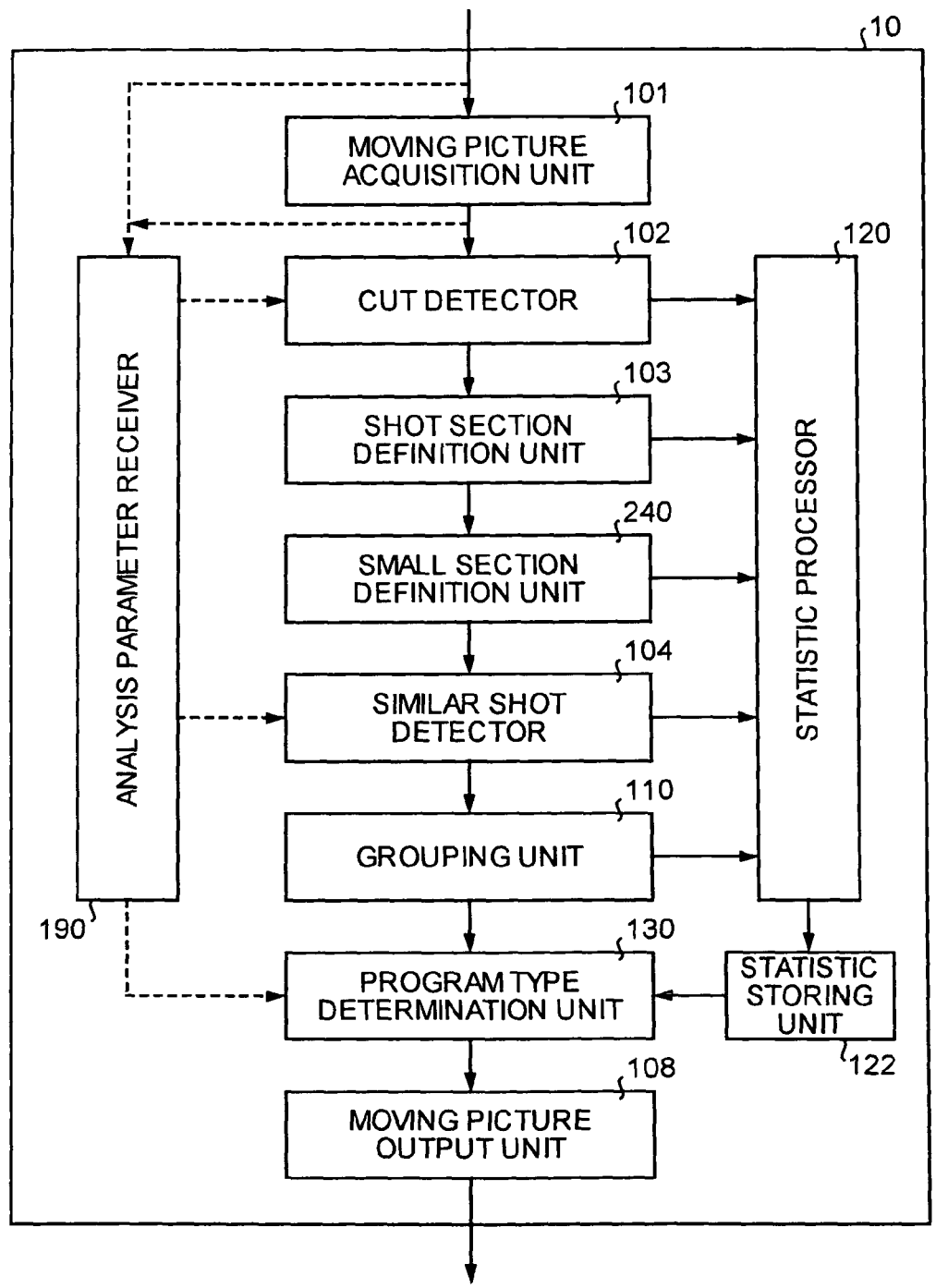
FIG. 21 is a block diagram of the functional configuration of a moving picture processor according to a fifth embodiment.

FIG. 21 is a block diagram of the functional configuration of the moving picture processor 10 according to the fifth embodiment. The moving picture processor 10 according to the fifth embodiment further includes a small section definition unit 240, in addition to the functional configuration of the moving picture processor 10 according to the third embodiment. The small section definition unit 240 divides the moving picture into a plurality of small sections. The small section definition unit 240 according to this embodiment constitutes a division unit according to the present invention.

Prior to the input of the moving picture to the moving picture acquisition unit 101, or at the time of input thereof, the analysis parameter receiver 190 may receive conditions (parameters) required for the respective processing of the cut detector 102, the similar shot detector 104, and the program type determination unit 130, and supply these to the detectors and the determination unit.

The analysis parameter receiver 190 may receive these parameters from the Internet or recording media as explained in the first embodiment.

Figure 22:
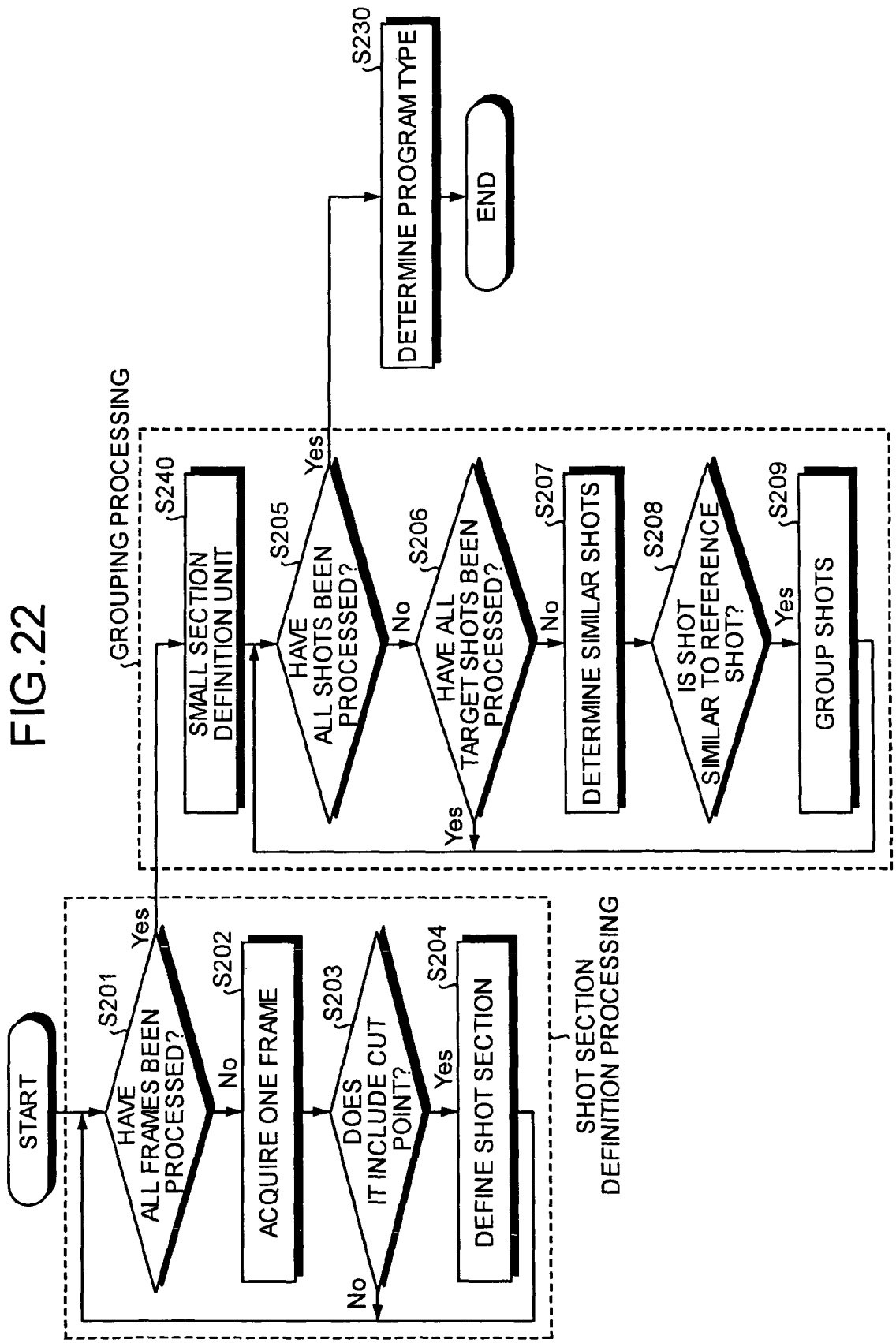
FIG. 22 is a flowchart of a moving picture processing in the moving picture processor according to the fifth embodiment.

FIG. 22 is a flowchart of the moving picture processing in the moving picture processor 10 according to the fifth embodiment. In the moving picture processing according to the fifth embodiment, small section definition processing (step S240) is performed, following the shot section definition processing (step S204) explained in the third embodiment. The small section definition processing by the small section definition unit 240 is as described above.

When the analysis parameter reception step (not shown) exists, detection and determination processing at steps S203, S207, and S230 may be performed, by using the optimum parameter setting for each program received from the Internet or the like at the analysis parameter reception step, before or during the processing.

When the program type is detected for each small section, even in a program, which is one program, but in which a plurality of components (talk, interview, music, news announcement) are combined, for example, "from 14"00' to 15"00': interview", or "from 7"11' to 9"49': music", the type attribute can be automatically allocated to each segment.

As a result, when the program itself has a plurality of segments, since the attribute indicating the type (news, interview, talk, and the like) can be automatically allocated, a user can easily search the preferred scene.

The configuration and processing other than those explained above of the moving picture processor 10 according to the fifth embodiment are the same as those of the moving picture processor 10 according to the third embodiment.

Figure 23:
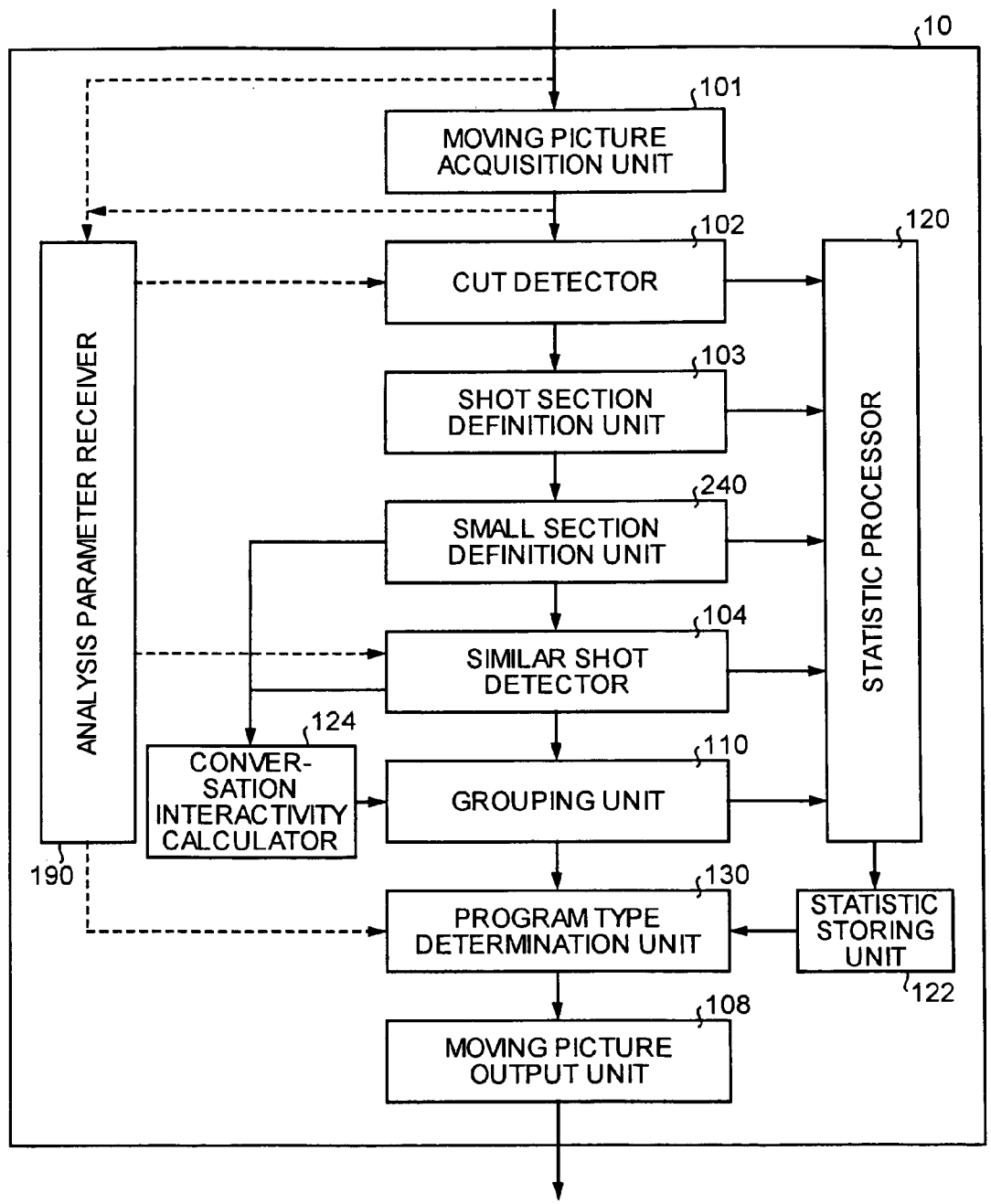
FIG. 23 is a block diagram of the functional configuration of a moving picture processor according to a sixth embodiment.
Figure 24:
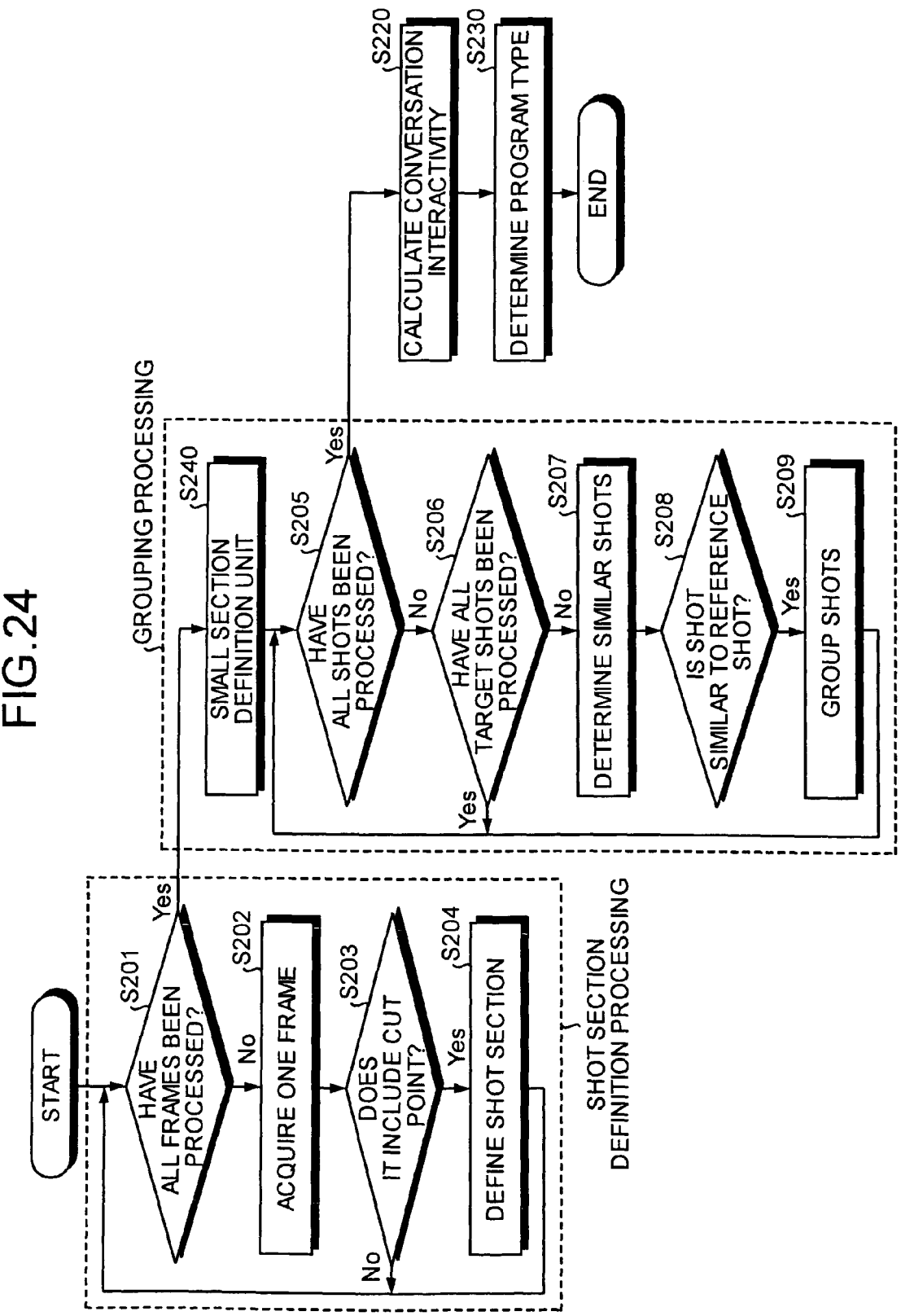
FIG. 24 is a flowchart of a moving picture processing by the moving picture processor according to the sixth embodiment.

The moving picture processor 10 according to a sixth embodiment will be explained. The moving picture processor 10 according to the sixth embodiment determines the program type with respect to the respective small sections based on the conversation interactivity. FIG. 23 is a block diagram of the functional configuration of the moving picture processor 10 according to the sixth embodiment. FIG. 24 is a flowchart of the moving picture processing by the moving picture processor 10 according to the sixth embodiment. In the moving picture processing according to the sixth embodiment, conversation interactivity calculation processing (step S220) is performed immediately before the program type determination processing (step S230) explained in the fifth embodiment. The conversation interactivity calculation processing by the conversation frequency calculator 124 is as described above.

The configuration and processing other than those explained above of the moving picture processor 10 according to the sixth embodiment are the same as those of the moving picture processor 10 according to the fifth embodiment.

The moving picture processor according to the present invention selects the lead shot in a metashot, based on the appearance pattern in which similar shots appear, thereby exhibiting an effect such that a metashot in an appropriate unit can be generated with respect to images of news program and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving picture processor for generating a metashot which includes a set of continuous shots as a repetitive unit of an image, comprising:
   a similarity calculator which calculates a similarity between shots, which refer to temporal parts of a moving picture, into which the moving picture is segmented at a point of scene change of the moving picture;
   a similar shot specifying unit which specifies similar shots based on the similarity;
   a grouping unit which divides the shots into a plurality of groups, each group including the similar shots specified;
   a lead group selector which selects at least one lead group from the plurality of groups based on a first predetermined condition, the lead group including candidates of a plurality of lead shots which should be a head of the metashot;
   a conversation interactivity calculator which calculates conversation interactivity indicating a probability that a target shot belonging to a same group is a shot indicating a conversation scene, based on an appearance pattern of shots belonging to the same group;
   a lead shot selector which selects the target shot as the lead shots from the candidates included in the lead group, when the conversation interactivity calculated by the conversation interactivity calculator is smaller than a predetermined reference value; and
   a metashot generator which generates the metashot including the lead shot selected at the head, wherein,
   the lead shot selector selects one of shots belonging to a first group and one of shots belonging to a second group, calculates the conversation interactivity with respect to sections from a start time of one of the two shots, which is closer to the head in the moving picture, to a finish time of another one being closer to an end in the moving picture, and selects the second group in which the conversation interactivity is maximum, and a shot belonging to the second group, and
   when the maximum value of the conversation interactivity with respect to the selected one shot belonging to the first group is higher than a predetermined conversation interactivity, the lead shot selector determines two shots having the maximum value of conversation interactivity, and a time section between the two shots as a conversation section, and either selects the lead shot from the conversation section or excludes the lead shot from a selection target.

2. The moving picture processor according to claim 1, wherein starting time of the metashot is starting time of the lead shot.

3. The moving picture processor according to claim 1, further comprising:
a shot number comparator which compares a number of shots belonging to a same group with a predetermined reference number, wherein
when the shot number comparator determines that the number of shots belonging to the same group is larger than the reference number, the lead group selector selects the same group as the lead group.

4. The moving picture processor according to claim 1, further comprising:
a shortest time length comparator which compares a reproduction time length of a shot having a shortest reproduction time length, of shots belonging to a same group, with a predetermined reference shortest time length, wherein
when the shortest time length comparator determines that the shortest reproduction time length of the shot is longer than the reference shortest time length, the lead group selector selects the same group as the lead group.

5. The moving picture processor according to claim 1, further comprising:
a longest time length comparator which compares a reproduction time length of a shot having a longest reproduction time length, of shots belonging to a same group, with a predetermined reference longest time length, wherein
when the longest time length comparator determines that the longest reproduction time length of the shot is longer than the reference longest time length, the lead group selector selects the same group as the lead group.

6. The moving picture processor according to claim 1, further comprising:
a time length mean value calculator which calculates a mean value of reproduction time lengths of shots belonging to a same group; and
a mean time length comparator which compares the mean value of the reproduction time length with a predetermined reference mean time length, wherein
when the mean time length comparator determines that the mean value of the reproduction time length is longer than the reference mean time length, the lead group selector selects the same group as the lead group.

7. The moving picture processor according to claim 1, further comprising:
a shot interval time length measurement unit which measures a reproduction time length between a first shot arranged first in the moving picture, of shots belonging to a same group and a second shot arranged last in the moving picture; and
a shot interval time length comparator which compares the reproduction time length with a predetermined reference time length between shots, wherein
when the shot interval time length comparator determines that the reproduction time length is longer than the reference time length, the lead group selector selects the group as the lead group.

8. The moving picture processor according to claim 1, further comprising:
a shot position determination unit which determines whether all shots belonging to a first group are arranged between two shots belonging to a second group, wherein
when the shot position determination unit determines that the all shots belonging to the first group are not arranged between the two shots belonging to the second group, the lead group selector selects the first group as the lead group.

9. The moving picture processor according to claim 1, wherein the lead shot selector determines, as a conversation section, a time section in which the conversation interactivity is larger than a predetermined reference value, and either selects the lead shot from the conversation section or excludes the lead shot from a selection target.

10. The moving picture processor according to claim 9, further comprising:
a reference range specifying unit which specifies a reference range including a target shot belonging to a predetermined group and having a predetermined time length; and
a shot time length calculator which calculates a total time length of shots belonging to a group and arranged within the reference range, wherein
the conversation interactivity calculator calculates a ratio of the total time length to the time length within the reference range, as the conversation interactivity.

11. The moving picture processor according to claim 9, further comprising:
a reference range specifying unit which specifies a reference range including a target shot belonging to a predetermined group and having a predetermined time length;
a first shot number calculator which calculates a number of shots included in the reference range; and
a second shot number calculator which calculates, as the conversation interactivity, a number of shots belonging to a group and arranged within the reference range, wherein
the conversation interactivity calculator calculates a ratio of a number of shots calculated by the second shot number calculator to a number of shots calculated by the first shot number calculation unit.

12. The moving picture processor according to claim 9, further comprising:
a range specifying unit which specifies a target time section for which the conversation interactivity in the moving picture is to be calculated; and
a shot time length calculator which calculates a total time length of shots belonging to a group and arranged within the target time section, wherein
the conversation interactivity calculator calculates a ratio of the total time length to a time length of the target time section as the conversation interactivity.

13. The moving picture processor according to claim 9, further comprising:
a range specifying unit which specifies a target time section for which the conversation interactivity in the moving picture is to be calculated; and
a shot number calculator which calculates a number of shots belonging to a group and arranged within the target time section, wherein
the conversation interactivity calculator calculates a ratio of the number of shots to a time length of the target time section, as the conversation interactivity.

14. The moving picture processor according to claim 9, further comprising:
- a range specifying unit which specifies a target time section for which the conversation interactivity in the moving picture is to be calculated;
- a shot time length calculator which calculates a total time length of shots belonging to a group and arranged within the target time section; and
- a shot number calculator which calculates a number of shots belonging to a group and arranged within the target time section, wherein
- the conversation interactivity calculator calculates a product of a first ratio of the total time length to a time length of the target time section, and a second ratio of the number of shots to the time length of the target time section, as the conversation interactivity.

15. The moving picture processor according to claim 1, wherein the lead shot selector determines a conversation section, and does not select a shot belonging to the conversation section as the lead shot.

16. The moving picture processor according to claim 1, wherein the lead shot selector determines a conversation section, and selects, as the lead shot, at least one of a lead shot and a last shot in the conversation section.

17. The moving picture processor according to claim 1, wherein the lead shot selector determines a conversation section, and when there is a shot belonging to a group in the conversation section, selects, as the lead shot, at least one of a first shot belonging to the group and closest to a head in the conversation section, and a second shot belonging to the group and closest to an end in the conversation section.

18. The moving picture processor according to claim 1, wherein the lead shot selector determines a conversation section, and when there is a shot belonging to a group selected as the lead group by the lead group selector in the conversation section, selects, as the lead shot, at least one of a first shot belonging to the lead group and closest to a head in the conversation section, and a second shot belonging to the lead group and closest to an end in the conversation section.

19. The moving picture processor according to claim 1, wherein the lead shot selector determines a conversation section, and determines the presence of a group, of the groups made by the grouping unit, which satisfies a condition that all shots belonging to the group do not belong to any conversation section in the moving picture, and when there is the group satisfying the condition, selects a shot belonging to the group as the lead shot.

20. The moving picture processor according to claim 1, further comprising:
- a reference range specifying unit which specifies a reference range including a target shot belonging to a predetermined group and having a predetermined time length; and
- a shot time length calculator which calculates a total time length of shots belonging to a group and arranged within the reference range, wherein
- the conversation interactivity calculator calculates a ratio of the total time length to the time length within the reference range, as the conversation interactivity.

21. The moving picture processor according to claim 1, further comprising:
- a reference range specifying unit which specifies a reference range including a target shot belonging to a predetermined group and having a predetermined time length;
- a first shot number calculator which calculates a number of shots included in the reference range; and
- a second shot number calculator which calculates, as the conversation interactivity, a number of shots belonging to a group and arranged within the reference range, wherein
- the conversation interactivity calculator calculates a ratio of a number of shots calculated by the second shot number calculator to a number of shots calculated by the first shot number calculation unit.

22. The moving picture processor according to claim 1, further comprising:
- a range specifying unit which specifies a target time section for which the conversation interactivity in the moving picture is to be calculated; and
- a shot time length calculator which calculates a total time length of shots belonging to a group and arranged within the target time section, wherein
- the conversation interactivity calculator calculates a ratio of the total time length to a time length of the target time section as the conversation interactivity.

23. The moving picture processor according to claim 1, further comprising:
- a range specifying unit which specifies a target time section for which the conversation interactivity in the moving picture is to be calculated; and
- a shot number calculator which calculates a number of shots belonging to a group and arranged within the target time section, wherein
- the conversation interactivity calculator calculates a ratio of the number of shots to a time length of the target time section, as the conversation interactivity.

24. The moving picture processor according to claim 1, further comprising:
- a range specifying unit which specifies a target time section for which the conversation interactivity in the moving picture is to be calculated;
- a shot time length calculator which calculates a total time length of shots belonging to a group and arranged within the target time section; and
- a shot number calculator which calculates a number of shots belonging to a group and arranged within the target time section, wherein
- the conversation interactivity calculator calculates a product of a first ratio of the total time length to a time length of the target time section, and a second ratio of the number of shots to the time length of the target time section, as the conversation interactivity.

25. The moving picture processor according to claim 1, further comprising:
- an analysis parameter receiver which receives an analysis processing condition for the moving picture, wherein
- at least one of the similarity calculator, the lead group selector, and the lead shot selector operates based on the analysis processing condition.

26. The moving picture processor according to claim 1, wherein
- the lead shot selector selects the lead shot by excluding shots which are not satisfied with a second predetermined condition based on the appearance pattern from the candidates.

27. A moving picture processor comprising:
- a cut detector which detects a point of scene change of a moving picture;
- a similarity calculator which calculates a similarity between shots, which refer to temporal parts of the moving image, into which the moving picture is segmented at the point of scene change;

a similar shot specifying unit which specifies similar shots based on the similarity;

a grouping unit which divides the shots into a plurality of groups, each group including the similar shots specified;

a group presence range specifying unit which specifies, as a group presence range, a portion between a first shot arranged first in the moving picture, of shots belonging to a same group, and a second shot arranged last in the moving picture;

a metashot specifying unit which performs addition calculation with respect to the group presence range specified by the group presence range specifying unit, respectively, with respect to a plurality of groups included in the moving picture, to specify, as a metashot, a shot including in the range obtained by the addition calculation; and a moving picture type determination unit which determines a type of the moving picture, based on existence of a lead shot in the group, wherein, the lead shot should be a head of a metashot which includes a set of continuous shots as a repetitive unit of an image, and the moving picture type determination unit determines the type of the moving picture based on an appearance pattern of the metashot.

28. The moving picture processor according to claim 27, further comprising:

a shot number comparator which compares a number of shots belonging to a same group with a predetermined reference number, wherein the moving picture type determination unit determines the type of the moving picture based on a comparison result by the shot number comparator.

29. The moving picture processor according to claim 27, further comprising:

a shortest time length comparator which compares a reproduction time length of a shot having a shortest reproduction time length, of shots belonging to a same group, with a predetermined reference shortest time length, wherein the moving picture type determination unit determines the type of the moving picture based on a comparison result by the shortest time length comparator.

30. The moving picture processor according to claim 27, further comprising:

a longest time length comparator which compares a reproduction time length of a shot having a longest reproduction time length, of shots belonging to a same group, with a predetermined reference longest time length, wherein the moving picture type determination unit determines the type of the moving picture based on a comparison result by the longest time length comparator.

31. The moving picture processor according to claim 27, further comprising:

a time length mean value calculator which calculates a mean value of reproduction time lengths of shots belonging to a same group;

a mean value determination unit which determines whether the mean value of the reproduction time lengths is within a range of a predetermined reference mean time length; and a reference mean time group number calculator which calculates a number of groups determined to be within the reference mean time length, wherein the moving picture type determination unit determines the type of the moving picture based on a calculation by the reference means time group number calculator.

32. The moving picture processor according to claim 27, further comprising:

a shot interval time length measurement unit which measures a reproduction time length between shots, between a first shot arranged first in the moving picture, of shots belonging to a same group, and a second shot arranged last in the moving picture;

a shot interval time length determination unit which determines whether the reproduction time length is within a range of a predetermined reference time length between shots; and a group number calculator which calculates a number of groups determined to be within the range of the reference time length, wherein the moving picture type determination unit determines the type of the moving picture based on a calculation of the reference shot group number calculator.

33. The moving picture processor according to claim 27, further comprising:

a conversation interactivity calculator which calculates conversation interactivity indicating a probability that a target shot belonging to a same group is a shot indicating a conversation scene, based on an appearance pattern of shots belonging to the same group; and a metashot specifying unit which specifies, as one metashot, a shot corresponding to the conversation interactivity is within a reference range, when the conversation interactivity is within a range of a predetermined reference ratio, wherein the moving picture type determination unit determines the type of the moving picture based on an appearance pattern of the metashot specified by the metashot specifying unit.

34. The moving picture processor according to claim 33, wherein the moving picture type determination unit determines the type of the moving picture based on a number of metashots included in the moving picture.

35. The moving picture processor according to claim 33, wherein the moving picture type determination unit determines the type of the moving picture based on a total value of reproduction time lengths of the metashots included in the moving picture.

36. The moving picture processor according to claim 33, wherein the moving picture type determination unit determines the type of the moving picture based on a shortest reproduction time length of the metashots included in the moving picture.

37. The moving picture processor according to claim 33, wherein the moving picture type determination unit determines the type of the moving picture based on a longest reproduction time length of the metashots included in the moving picture.

38. The moving picture processor according to claim 33, wherein the moving picture type determination unit determines the type of the moving picture based on a mean reproduction time length of the metashots included in the moving picture.

39. The moving picture processor according to claim 27, wherein the moving picture type determination unit determines the type of the moving picture based on a number of metashots included in the moving picture.

40. The moving picture processor according to claim 27, wherein the moving picture type determination unit determines the type of the moving picture based on a total value of reproduction time lengths of the metashots included in the moving picture.

41. The moving picture processor according to claim 27, wherein the moving picture type determination unit determines the type of the moving picture based on a shortest reproduction time length of the metashots included in the moving picture.

42. The moving picture processor according to claim 27, wherein the moving picture type determination unit determines the type of the moving picture based on a longest reproduction time length of the metashots included in the moving picture.

43. The moving picture processor according to claim 27, wherein the moving picture type determination unit determines the type of the moving picture based on a mean reproduction time length of the metashots included in the moving picture.

44. The moving picture processor according to claim 27, further comprising:
a program conversation interactivity calculator which calculates a program conversation interactivity indicating a vivaciousness of conversation with respect to the whole moving picture, wherein
the moving picture type determination unit determines the type of the moving picture based on the program conversation interactivity.

45. The moving picture processor according to claim 44, further comprising:
a shot time length calculator which calculates a total time length of shots belonging to a group in the moving picture, wherein
the program conversation frequency calculator calculates a ratio of the total time length to a time length of the moving picture, as the program conversation interactivity.

46. The moving picture processor according to claim 44, further comprising:
a shot number calculator which calculates a number of shots belonging to a group in the moving picture, wherein
the program conversation interactivity calculator calculates a ratio of the number of shots to a time length of the moving picture, as the program conversation interactivity.

47. The moving picture processor according to claim 44, further comprising:
a shot time length calculator which calculates a total time length of shots belonging to a group in the moving picture; and
a shot number calculation unit which calculates a number of shots belonging to a group in the moving picture, wherein
the program conversation interactivity calculator calculates a product of a ratio of the total time length to a time length of the moving picture, and a ratio of the number of shots to the time length of the moving picture, as the program conversation interactivity.

48. The moving picture processor according to claim 27, wherein the moving picture type determination unit determines the type of the moving picture based on a comparison of a start time of a metashot appearing at a specified order from a head of the moving picture with one of a predetermined time from a head of the moving picture and a predetermined ratio with respect to a length of the moving picture.

49. The moving picture processor according to claim 27, further comprising:
a divider which divides the moving picture into a plurality of time sections, wherein
the moving picture type determination unit determines the type of the moving picture for each time section divided.

50. The moving picture processor according to claim 27, further comprising:
an analysis parameter receiver which receives an analysis processing condition for the moving picture, wherein
at least one of the cut detector, the similar shot specifying unit, and the moving picture type determination unit operates based on the analysis processing condition.

51. A computer-implemented method for generating a metashot which includes a set of continuous shots as a repetitive unit of an image of a moving picture, at least one processor performing the steps of:
calculating a similarity between shots, which refer to temporal parts of a moving picture, into which the moving picture is segmented at a point of scene change of the moving picture;
specifying similar shots based on the similarity;
dividing the shots into a plurality of groups, each group including the similar shots specified;
selecting at least one lead group from the plurality of groups based on a first predetermined condition in a storage unit, the lead group including candidates of a plurality of lead shots which should be a head of the metashot;
calculating conversation interactivity indicating a probability that a target shot belonging to a same group is a shot indicating a conversation scene, based on an appearance pattern of shots belonging to the same group;
selecting the target shot as the lead shots from the candidates included in the lead group, when the calculated conversation interactivity is smaller than a predetermined reference value; and
generating the metashot including the lead shot selected at the head, wherein,
the selecting of the lead shots includes selecting one of shots belonging to a first group and one of shots belonging to a second group, calculating the conversation interactivity with respect to sections from a start time of one of the two shots, which is closer to the head in the moving picture, to a finish time of another one being closer to an end in the moving picture, and selecting the second group in which the conversation interactivity is maximum, and a shot belonging to the second group, and
when the maximum value of the conversation interactivity with respect to the selected one shot belonging to the first group is higher than a predetermined conversation interactivity, the selecting of the lead shot includes determining two shots having the maximum value of conversation interactivity, and a time section between the two shots as a conversation section, and either selecting the lead shot from the conversation section or excluding the lead shot from a selection target.

52. The computer-implemented method according to claim 51, the processor further performing the step of:
receiving an analysis processing condition for the moving picture, wherein
at least one of the calculating, the selecting a lead group, and selecting the lead shot performs based on the analysis processing condition.

53. A computer-implemented method for moving picture, at least one processor performing the steps of:
- detecting a point of scene change of a moving picture;
- calculating a similarity between shots, which refer to temporal parts of the moving picture, into which the moving picture is segmented at the point of scene change;
- specifying similar shots based on the similarity;
- dividing the shots into a plurality of groups, each group including the similar shots specified;
- specifying, as a group presence range, a portion between a first shot arranged first in the moving picture, of shots belonging to a same group, and a second shot arranged last in the moving picture;
- performing addition calculation with respect to the group presence range specified by the group presence range specifying unit, respectively, with respect to a plurality of groups included in the moving picture, to specify, as a metashot, a shot included in the range obtained by the addition calculation; and
- determining a type of the moving picture, based on existence of a lead shot in the group, wherein,
- the lead shot should be a head of a metashot which includes a set of continuous shots as a repetitive unit of an image, and
- the determining includes determining the type of the moving picture based on an appearance pattern of the metashot.

54. The computer-implemented method according to claim 53, the processor further performing the step of:
- receiving an analysis processing condition for the moving picture, wherein
- at least one of the detecting, the specifying, and the determining performs based on the analysis processing condition.

55. A computer program product including computer executable instructions stored on a non-transitory computer readable medium, wherein the instructions, when executed by a computer, cause a computer to perform:
- calculating a similarity between shots, which refer to temporal parts of a moving picture, into which the moving picture is segmented at a point of scene change of the moving picture;
- specifying similar shots based on the similarity;
- dividing the shots into a plurality of groups, each group including the similar shots specified;
- selecting at least one lead group from the plurality of groups based on a first predetermined condition, the lead group including candidates of a plurality of lead shots which should be a head of a metashot which includes a set of continuous shots as a repetitive unit of an image;
- calculating conversation interactivity indicating a probability that a target shot belonging to a same group is a shot indicating a conversation scene, based on an appearance pattern of shots belonging to the same group;
- selecting the target shot as the lead shots from the candidates included in the lead group, when the calculated conversation interactivity is smaller than a predetermined reference value; and generating the metashot including the lead shot selected at the head, wherein, the selecting of the lead shots includes selecting one of shots belonging to a first group and one of shots belonging to a second group, calculating the conversation interactivity with respect to sections from a start time of one of the two shots, which is closer to the head in the moving picture, to a finish time of another one being closer to an end in the moving picture, and selecting the second group in which the conversation interactivity is maximum, and a shot belonging to the second group, and when the maximum value of the conversation interactivity with respect to the selected one shot belonging to the first group is higher than a predetermined conversation interactivity, the selecting of the lead shot includes determining two shots having the maximum value of conversation interactivity, and a time section between the two shots as a conversation section, and either selects the lead shot from the conversation section or excluding the lead shot from a selection target.

56. The computer program product according to claim 55, wherein
- the instructions further cause the computer to perform receiving an analysis processing condition for the moving picture, wherein
- at least one of the detecting, the specifying, and the determining performs based on the analysis processing condition.

57. A computer program product including computer executable instructions stored on a non-transitory computer readable medium, wherein the instructions, when executed by a computer, cause a computer to perform:
- detecting a point of scene change of a moving picture;
- calculating a similarity between shots, which refer to temporal parts of the moving picture, into which the moving picture is segmented at the point of scene change; specifying similar shots based on the similarity;
- dividing the shots into a plurality of groups, each group including the similar shots specified;
- specifying, as a group presence range, a portion between a first shot arranged first in the moving picture, of shots belonging to a same group, and a second shot arranged last in the moving picture;
- performing addition calculation with respect to the group presence range specified by the group presence range specifying unit, respectively, with respect to a plurality of groups included in the moving picture, to specify, as a metashot, a shot included in the range obtained by the addition calculation; and
- determining a type of the moving picture, based on existence of a lead shot in the group, wherein the lead shot should be a head of a metashot which includes a set of continuous shots as a repetitive unit of an image, the determining includes determining the type of the moving picture based on an appearance pattern of the metashot.

58. The computer program product according to claim 27, wherein
- the instructions further cause the computer to perform receiving an analysis processing condition for the moving picture, wherein
- at least one of the detecting, the specifying, and the determining performs based on the analysis processing condition.

* * * * *